United States Patent
Hu et al.

(10) Patent No.: US 12,477,530 B2
(45) Date of Patent: Nov. 18, 2025

(54) SCALABLE WAVEFORM AND NUMEROLOGY DESIGNS FOR NEXT-GENERATION WLAN IN 60GHz BAND

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 211 days.

(21) Appl. No.: 18/111,772

(22) Filed: Feb. 20, 2023

(65) Prior Publication Data
US 2023/0284195 A1      Sep. 7, 2023

Related U.S. Application Data

(60) Provisional application No. 63/316,445, filed on Mar. 4, 2022.

(51) Int. Cl.
*H04W 72/0457* (2023.01)
*H04W 84/12* (2009.01)

(52) U.S. Cl.
CPC ........ *H04W 72/0457* (2023.01); *H04W 84/12* (2013.01)

(58) Field of Classification Search
None
See application file for complete search history.

(56) References Cited

U.S. PATENT DOCUMENTS

| | | | |
|---|---|---|---|
| 2020/0112468 A1 | 4/2020 | Gagiev et al. | |
| 2020/0314891 A1* | 10/2020 | Li | H04W 74/006 |
| 2021/0211234 A1* | 7/2021 | Kneckt | H04L 1/1614 |
| 2022/0240334 A1* | 7/2022 | Wang | H04W 76/15 |
| 2022/0255788 A1* | 8/2022 | Almadi | H04W 24/02 |
| 2022/0353123 A1* | 11/2022 | Kim | H04L 27/2603 |
| 2023/0180049 A1* | 6/2023 | Thubert | H04W 28/0975 370/232 |
| 2023/0299931 A1* | 9/2023 | Hu | H04L 5/0094 370/338 |

(Continued)

FOREIGN PATENT DOCUMENTS

| | | |
|---|---|---|
| CN | 107371249 A | 11/2017 |
| WO | WO 2021183035 A1 | 9/2021 |

OTHER PUBLICATIONS

Taiwan Intellectual Property Office, Office Action in Taiwan Patent Application No. 112107719, Jun. 12, 2023.

(Continued)

*Primary Examiner* — Phirin Sam
(74) *Attorney, Agent, or Firm* — Andy M. Han; Han IP PLLC

(57) ABSTRACT

Techniques pertaining to scalable waveform and numerology designs for next-generation wireless local area networks (WLANs) in 60 GHz are described. A first apparatus communicates in a 60 GHz band wirelessly with a second apparatus based on a specific numerology design with at least one of: (i) selection of a specific subcarrier frequency spacing; (ii) selection of a specific guard interval (GI) design; and (iii) reuse of a preexisting channelization or tone plan.

18 Claims, 13 Drawing Sheets

(56) References Cited

U.S. PATENT DOCUMENTS

| | | | |
|---|---|---|---|
| 2023/0318891 A1* | 10/2023 | Hu | H04L 27/2603 |
| | | | 370/329 |
| 2024/0048948 A1* | 2/2024 | Kang | H04W 76/14 |
| 2024/0322962 A1* | 9/2024 | Lou | H04L 25/067 |
| 2024/0414755 A1* | 12/2024 | Sun | H04W 72/0453 |
| 2024/0414756 A1* | 12/2024 | Chen | H04L 5/0091 |
| 2025/0048336 A1* | 2/2025 | Agiwal | H04W 72/04 |

OTHER PUBLICATIONS

European Patent Office, Extended European Search Report in European Patent Application No. 23158819.5, Jul. 11, 2023.
Zte et al.: "Discussion on the required changes to NR for above 52.6GHz", 3GPP TSG RAN WG1 #101, R1-2003461, e-Meeting, May 25-Jun. 5, 2020.

* cited by examiner

| BW (MHz) | 540 | 1080 | 2160 | 4320 | 6480 | 8640 |
|---|---|---|---|---|---|---|
| ΔF (MHz) | 2.109375 | 2.109375 | 2.109375 | 2.109375 | 2.109375 | 2.109375 |
| Tdft(us) | 0.474 | 0.474 | 0.474 | 0.474 | 0.474 | 0.474 |
| Tgi,short(us) | 0.015 | 0.015 | 0.015 | 0.015 | 0.015 | 0.015 |
| Tgi,normal(us) | 0.030 | 0.030 | 0.030 | 0.030 | 0.030 | 0.030 |
| Tgi,long(us) | 0.059 | 0.059 | 0.059 | 0.059 | 0.059 | 0.059 |
| Tsym(us) | Tdft+Tgi | Tdft+Tgi | Tdft+Tgi | Tdft+Tgi | Tdft+Tgi | Tdft+Tgi |
| Fs(MHz) | 540 | 1080 | 2160 | 4320 | 6480 | 8640 |
| Nfft | 256 | 512 | 1024 | 2048 | 3072 | 4096 |
| Nsd | 234 | 468 | 980 | 1960 | 2940 | 3920 |
| Nsp | 8 | 16 | 16 | 32 | 48 | 64 |
| Ndc | 3 | 5 | 5 | 23 | 23 | 23 |
| Nst | 242 | 484 | 996 | 1992 | 2988 | 3984 |
| Nguard(left,right) | (6,5) | (12,11) | (12,11) | (12,11) | (12,11) | (12,11) |
| Tone Plan | RU242 | RU484 | RU996 | RU2x996 | RU(3x996) | RU4x996 |

FIG. 4

| BW (MHz) | 540 | 1080 | 2160 | 4320 | 6480 | 8640 |
|---|---|---|---|---|---|---|
| ΔF (MHz) | 2.109375 | 4.21875 | 4.21875 | 4.21875 | 4.21875 | 4.21875 |
| Tdft (us) | 0.474 | 0.237 | 0.237 | 0.237 | 0.237 | 0.237 |
| Tg,short(us) | 0.015 | 0.015 | 0.015 | 0.015 | 0.015 | 0.015 |
| Tg,normal(us) | 0.030 | 0.030 | 0.030 | 0.030 | 0.030 | 0.030 |
| Tg,long(us) | 0.059 | 0.059 | 0.059 | 0.059 | 0.059 | 0.059 |
| Tsym(us) | Tdft+Tgi | Tdft+Tgi | Tdft+Tgi | Tdft+Tgi | Tdft+Tgi | Tdft+Tgi |
| Fs(MHz) | 540 | 1080 | 2160 | 4320 | 6480 | 8640 |
| Nfft | 256 | 256 | 512 | 1024 | 1536 | 2048 |
| Nsd | 234 | 234 | 468 | 980 | 1448 | 1872 |
| Nsp | 8 | 8 | 16 | 16 | 32 | 32 |
| Ndc | 3 | 3 | 5 | 5 | 23 | 23 |
| Nst | 242 | 242 | 484 | 996 | 484+996 | 1992 |
| Nguard(left,right) | (6,5) | (6,5) | (12,11) | (12,11) | (12,11) | (12,11) |
| Tone Plan | RU242 | RU242 | RU484 | RU996 | RU(484+996) | RU2x996 |

| BW (MHz) | 480 | 960 | 1920 | 3840 | 5760 | 7680 |
|---|---|---|---|---|---|---|
| ΔF (MHz) | 1.875 | 1.875 | 1.875 | 1.875 | 1.875 | 1.875 |
| Tdft (us) | 0.533 | 0.533 | 0.533 | 0.533 | 0.533 | 0.533 |
| Tgi,short(us) | 0.017 | 0.017 | 0.017 | 0.017 | 0.017 | 0.017 |
| Tgi,normal(us) | 0.033 | 0.033 | 0.033 | 0.033 | 0.033 | 0.033 |
| Tgi,long(us) | 0.067 | 0.067 | 0.067 | 0.067 | 0.067 | 0.067 |
| Tsym(us) | Tdft+Tgi | Tdft+Tgi | Tdft+Tgi | Tdft+Tgi | Tdft+Tgi | Tdft+Tgi |
| Fs(MHz) | 480 | 960 | 1920 | 3840 | 5760 | 7680 |
| Nfft | 256 | 512 | 1024 | 2048 | 3072 | 4096 |
| Nsd | 234 | 468 | 980 | 1960 | 2940 | 3920 |
| Nsp | 8 | 16 | 16 | 32 | 48 | 64 |
| Ndc | 3 | 5 | 5 | 23 | 23 | 23 |
| Nst | 242 | 484 | 996 | 1992 | 2988 | 3984 |
| Nguard(left,right) | (6,5) | (12,11) | (12,11) | (12,11) | (12,11) | (12,11) |
| Tone Plan | RU242 | RU484 | RU996 | RU2x996 | RU3x996 | RU4x996 |

FIG. 6

| BW (MHz) | 480 | 960 | 1920 | 3840 | 5760 | 7680 |
|---|---|---|---|---|---|---|
| ΔF (MHz) | 1.875 | 1.875 | 3.75 | 3.75 | 3.75 | 3.75 |
| Tdft (us) | 0.533 | 0.533 | 0.267 | 0.267 | 0.267 | 0.267 |
| Tgi,short(us) | 0.017 | 0.017 | 0.017 | 0.017 | 0.017 | 0.017 |
| Tgi,normal(us) | 0.033 | 0.033 | 0.033 | 0.033 | 0.033 | 0.033 |
| Tgi,long(us) | 0.067 | 0.067 | 0.067 | 0.067 | 0.067 | 0.067 |
| Tsym(us) | Tdft+Tgi | Tdft+Tgi | Tdft+Tgi | Tdft+Tgi | Tdft+Tgi | Tdft+Tgi |
| Fs(MHz) | 480 | 960 | 1920 | 3840 | 5760 | 7680 |
| Nfft | 256 | 512 | 512 | 1024 | 1536 | 2048 |
| Nsd | 234 | 468 | 468 | 980 | 1404 | 1960 |
| Nsp | 8 | 16 | 16 | 16 | 32 | 32 |
| Ndc | 3 | 5 | 5 | 5 | 5 | 23 |
| Nst | 242 | 484 | 484 | 996 | 1480 | 1992 |
| Nguard(left,right) | (6,5) | (12,11) | (12,11) | (12,11) | (12,11) | (12,11) |
| Tone Plan | RU242 | RU484 | RU484 | RU996 | RU(484+996) | RU2x996 |

FIG. 7

| BW (MHz) | 520 | 1040 | 2080 | 4160 | 6240 | 8320 |
|---|---|---|---|---|---|---|
| Δf (MHz) | 2.03125 | 2.03125 | 2.03125 | 2.03125 | 2.03125 | 2.03125 |
| Tdft (us) | 0.492 | 0.492 | 0.492 | 0.492 | 0.492 | 0.492 |
| Tgi,short(us) | 0.015 | 0.015 | 0.015 | 0.015 | 0.015 | 0.015 |
| Tgi,normal(us) | 0.031 | 0.031 | 0.031 | 0.031 | 0.031 | 0.031 |
| Tgi,long(us) | 0.062 | 0.062 | 0.062 | 0.062 | 0.062 | 0.062 |
| Tsym(us) | Tdft+Tgi | Tdft+Tgi | Tdft+Tgi | Tdft+Tgi | Tdft+Tgi | Tdft+Tgi |
| Fs(MHz) | 520 | 1040 | 2080 | 4160 | 6240 | 8320 |
| Nfft | 256 | 512 | 1024 | 2048 | 3072 | 4096 |
| Nsd | 234 | 468 | 980 | 1960 | 2940 | 3920 |
| Nsp | 8 | 16 | 16 | 32 | 48 | 64 |
| Ndc | 3 | 5 | 5 | 23 | 23 | 23 |
| Nst | 242 | 484 | 996 | 1992 | 2988 | 3984 |
| Nguard(left,right) | (6,5) | (12,11) | (12,11) | (12,11) | (12,11) | (12,11) |
| Tone Plan | RU242 | RU484 | RU996 | RU2x996 | RU3x996 | RU4x996 |

| BW (MHz) | 520 | 1040 | 2080 | 4160 | 6240 | 8320 |
|---|---|---|---|---|---|---|
| ΔF (MHz) | 2.03125 | 4.0625 | 4.0625 | 4.0625 | 4.0625 | 4.0625 |
| Tdft (us) | 0.492 | 0.246 | 0.246 | 0.246 | 0.246 | 0.246 |
| Tgi,short(us) | 0.015 | 0.015 | 0.015 | 0.015 | 0.015 | 0.015 |
| Tgi,normal(us) | 0.031 | 0.031 | 0.031 | 0.031 | 0.031 | 0.031 |
| Tgi,long(us) | 0.062 | 0.062 | 0.062 | 0.062 | 0.062 | 0.062 |
| Tsym(us) | Tdft+Tgi | Tdft+Tgi | Tdft+Tgi | Tdft+Tgi | Tdft+Tgi | Tdft+Tgi |
| Fs(MHz) | 520 | 1040 | 2080 | 4160 | 6240 | 8320 |
| Nfft | 256 | 256 | 512 | 1024 | 1536 | 2048 |
| Nsd | 234 | 234 | 468 | 980 | 1448 | 1960 |
| Nsp | 8 | 8 | 16 | 16 | 32 | 32 |
| Ndc | 3 | 3 | 5 | 5 | 23 | 23 |
| Nst | 242 | 242 | 484 | 996 | 484+996 | 1992 |
| Nguard(left,right) | (6,5) | (6,5) | (12,11) | (12,11) | (12,11) | (12,11) |
| Tone Plan | RU242 | RU242 | RU484 | RU996 | RU(484+996) | RU2x996 |

| BW (MHz) | 500 | 1000 | 2000 | 4000 | 6000 | 8000 |
|---|---|---|---|---|---|---|
| ΔF (MHz) | 1.953125 | 1.953125 | 1.953125 | 1.953125 | 1.953125 | 1.953125 |
| Tdft (us) | 0.512 | 0.512 | 0.512 | 0.512 | 0.512 | 0.512 |
| Tgi,short(us) | 0.016 | 0.016 | 0.016 | 0.016 | 0.016 | 0.016 |
| Tgi,normal(us) | 0.032 | 0.032 | 0.032 | 0.032 | 0.032 | 0.032 |
| Tgi,long(us) | 0.064 | 0.064 | 0.064 | 0.064 | 0.064 | 0.064 |
| Tsym(us) | Tdft+Tgi | Tdft+Tgi | Tdft+Tgi | Tdft+Tgi | Tdft+Tgi | Tdft+Tgi |
| Fs(MHz) | 500 | 1000 | 2000 | 4000 | 6000 | 8000 |
| Nfft | 256 | 512 | 1024 | 2048 | 3072 | 4096 |
| Nsd | 234 | 468 | 980 | 1960 | 2940 | 3920 |
| Nsp | 8 | 16 | 16 | 32 | 48 | 64 |
| Ndc | 3 | 5 | 5 | 23 | 23 | 23 |
| Nst | 242 | 484 | 996 | 1992 | 2988 | 3984 |
| Nguard(left,right) | (6,5) | (12,11) | (12,11) | (12,11) | (12,11) | (12,11) |
| Tone Plan | RU242 | RU484 | RU996 | RU2x996 | RU3x996 | RU4x996 |

FIG. 10

| BW (MHz) | 500 | 1000 | 2000 | 4000 | 6000 | 8000 |
|---|---|---|---|---|---|---|
| ΔF (MHz) | 1.953125 | 1.953125 | 3.90625 | 3.90625 | 3.90625 | 3.90625 |
| Tdft (us) | 0.512 | 0.512 | 0.256 | 0.256 | 0.256 | 0.256 |
| Tgi,short(us) | 0.016 | 0.016 | 0.016 | 0.016 | 0.016 | 0.016 |
| Tgi,normal(us) | 0.032 | 0.032 | 0.032 | 0.032 | 0.032 | 0.032 |
| Tgi,long(us) | 0.064 | 0.064 | 0.064 | 0.064 | 0.064 | 0.064 |
| Tsym(us) | Tdft+Tgi | Tdft+Tgi | Tdft+Tgi | Tdft+Tgi | Tdft+Tgi | Tdft+Tgi |
| Fs(MHz) | 500 | 1000 | 2000 | 4000 | 6000 | 8000 |
| Nfft | 256 | 512 | 512 | 1024 | 1536 | 2048 |
| Nsd | 234 | 468 | 468 | 936 | 1404 | 1872 |
| Nsp | 8 | 16 | 16 | 16 | 32 | 32 |
| Ndc | 3 | 5 | 5 | 23 | 23 | 23 |
| Nst | 242 | 484 | 996 | 1992 | 2988 | 3984 |
| Nguard(left,right) | (6,5) | (12,11) | (12,11) | (12,11) | (12,11) | (12,11) |
| Tone Plan | RU242 | RU484 | RU484 | RU996 | RU(484+996) | RU2x996 |

FIG. 11

SCALABLE WAVEFORM AND NUMEROLOGY DESIGNS FOR NEXT-GENERATION WLAN IN 60GHz BAND

CROSS REFERENCE TO RELATED PATENT APPLICATION

The present disclosure is part of a non-provisional patent application claiming the priority benefit of U.S. Provisional Patent Application No. 63/316,445, filed 4 Mar. 2022, the content of which herein being incorporated by reference in its entirety.

TECHNICAL FIELD

The present disclosure is generally related to wireless communications and, more particularly, to scalable waveform and numerology designs for next-generation wireless local area networks (WLANs) in 60 GHz.

BACKGROUND

Unless otherwise indicated herein, approaches described in this section are not prior art to the claims listed below and are not admitted as prior art by inclusion in this section.

Next-generation wireless communication, such as the 60 GHz unlicensed spectrum band, has been used and standardized in accordance with the Institute of Electrical and Electronics Engineers (IEEE) 802.11ad/ay/aj. One main advantage of the 60 GHz band is that a wider spectrum bandwidth is available to achieve a higher data rate with less interference. In an IEEE 802.11 ad directional multi-gigabit (DMG) system, the channel bandwidth is 2.16 GHz, and in an IEEE 802.11ay system, the channel bandwidth is further extended to 2.16 GHz, 4.32 GHz, 6.48 GHz and 8.64 GHz. On the other hand, IEEE 802.11 ax/be high-efficiency (HE)/extremely-high-throughput (EHT) systems have become the main wireless connectivity technologies and have been widely adopted in the market. However, the throughputs of the HE/EHT systems are not sufficient to support future applications such as, for example, augmented reality (AR), virtual reality (VR), metaverse and such. As such, there is an issue of how to leverage existing IEEE 802.11ax/be designs as much as possible to simplify implementations while taking advantage of the wider bandwidth of the 60 GHz band. Therefore, there is a need for a solution of scalable waveform and numerology designs for next-generation WLANs in 60 GHz.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to scalable waveform and numerology designs for next-generation WLANs in 60 GHz.

In one aspect, a method may involve a processor of a first apparatus communicating in a 60 GHz band wirelessly with a second apparatus by either or both: (a) transmitting first data or first information to the second apparatus; and (b) receiving second data or second information from the second apparatus. In communicating in the 60 GHz band wirelessly, the method may involve the processor communicating in the 60 GHz band wirelessly based on a specific numerology design with at least one of: (i) selection of a specific subcarrier frequency spacing; (ii) selection of a specific guard interval (GI) design; and (iii) reuse of a preexisting channelization or tone plan.

In another aspect, an apparatus may include a transceiver configured to communicate wirelessly and a processor coupled to the transceiver. The processor may communicate, via the transceiver, in a 60 GHz band wirelessly with one other apparatus by either or both: (a) transmitting first data or first information to the other apparatus; and (b) receiving second data or second information from the other apparatus. In communicating in the 60 GHz band wirelessly, the processor may communicate in the 60 GHz band wirelessly based on a specific numerology design with at least one of: (i) selection of a specific subcarrier frequency spacing; (ii) selection of a specific guard interval (GI) design; and (iii) reuse of a preexisting channelization or tone plan.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example design under a proposed scheme in accordance with the present disclosure.

FIG. 5 is a diagram of an example design under a proposed scheme in accordance with the present disclosure.

FIG. 6 is a diagram of an example design under a proposed scheme in accordance with the present disclosure.

FIG. 7 is a diagram of an example design under a proposed scheme in accordance with the present disclosure.

FIG. 8 is a diagram of an example design under a proposed scheme in accordance with the present disclosure.

FIG. 9 is a diagram of an example design under a proposed scheme in accordance with the present disclosure.

FIG. 10 is a diagram of an example design under a proposed scheme in accordance with the present disclosure.

FIG. 11 is a diagram of an example design under a proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to scalable waveform and numerology designs for next-generation WLANs in 60 GHz. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

Figure 1:
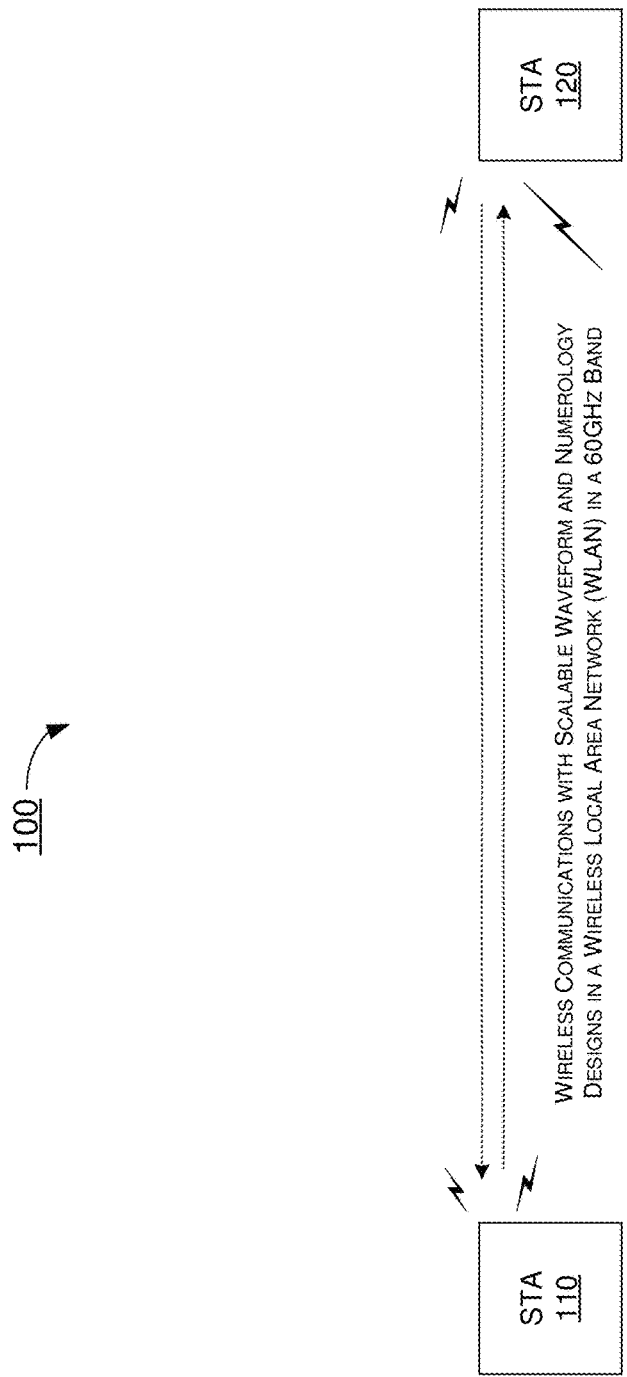
FIG. 1 is a diagram of an example network environment in which various solutions and schemes in accordance with the present disclosure may be implemented.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, and a bandwidth of 320 MHz may be interchangeably denoted as BW320 or BW320M FIG. 1 illustrates an example network environment 100 in which various solutions and schemes in accordance with the present disclosure may be implemented. FIG. 2~FIG. 13 illustrate examples of implementation of various proposed schemes in network environment 100 in accordance with the present disclosure. The following description of various proposed schemes is provided with reference to FIG. 1~FIG. 13.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an access point (AP) STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the scalable waveform and numerology designs for next-generation WLANs in 60 GHz in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
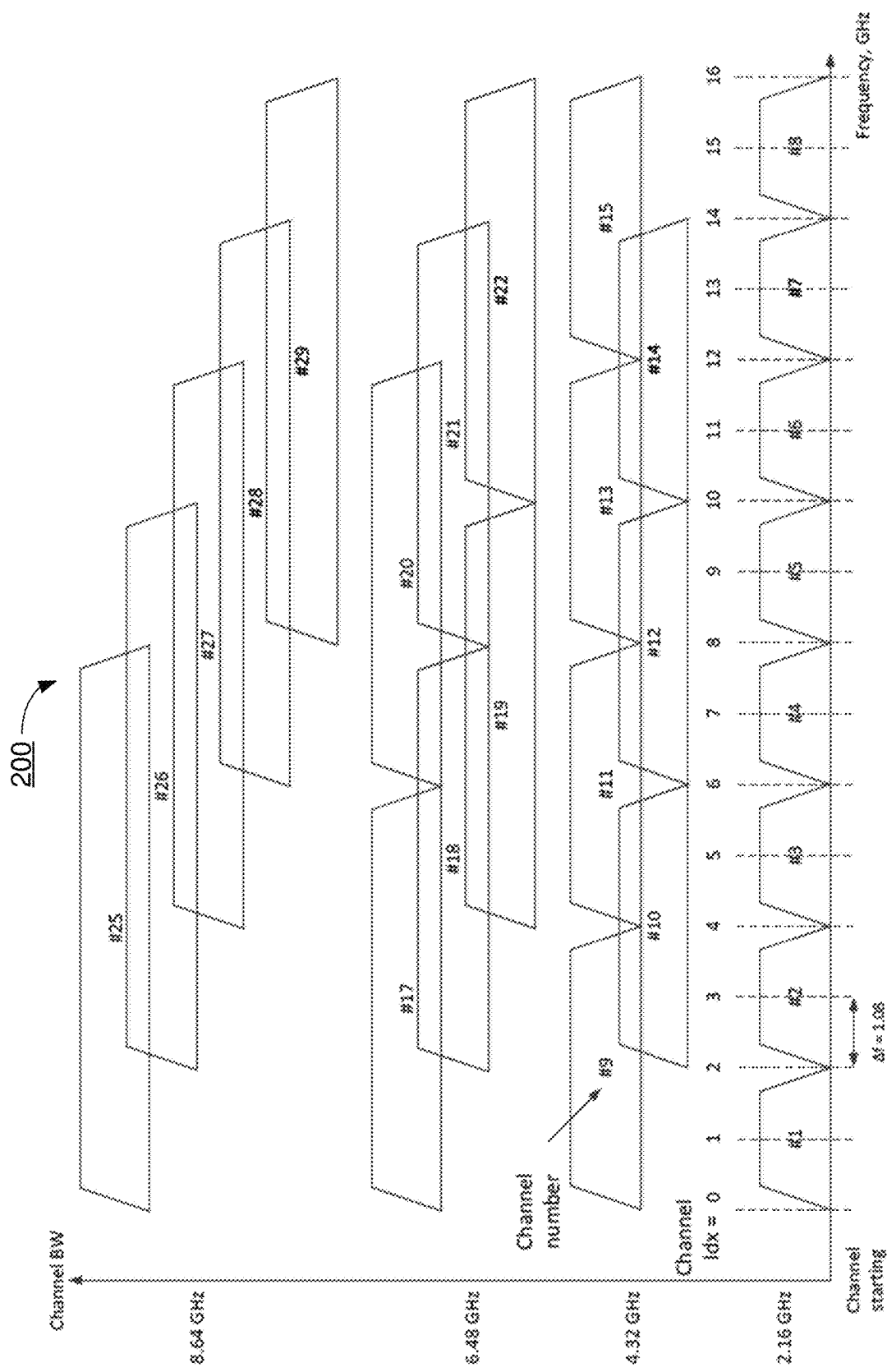
FIG. 2 is a diagram of an example scenario under a proposed scheme in accordance with the present disclosure.
Figure 3:
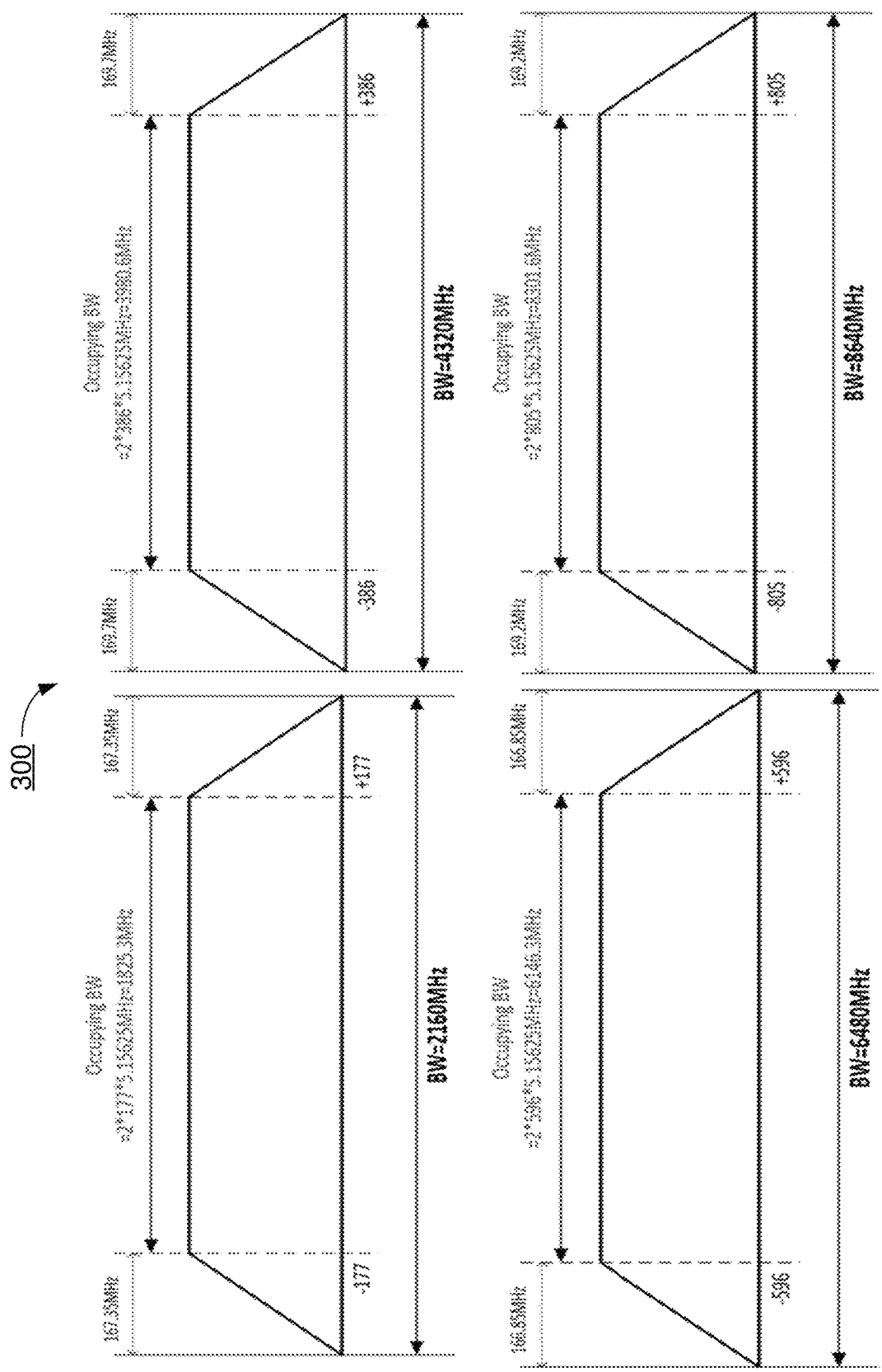
FIG. 3 is a diagram of an example scenario under a proposed scheme in accordance with the present disclosure.

Under the IEEE 802.11 ay specification, multiple enhanced directional multi-gigabit (EDMG) orthogonal frequency-division multiplexing (OFDM)-physical layer (PHY) related parameters are defined, including: bandwidth, subcarrier frequency spacing, discrete Fourier transform (DFT) size, number of direct-current (DC) tones, number of pilot tones, DFT period, GI, and sampling clock rate. The channel bandwidth may be any of 2160 MHz, 4320 MHz, 6480 MHz and 8640 MHz. The subcarrier frequency spacing ($\Delta F$) may be 5.15625 MHz. The DFT size may be any of 512, 1024, 1536 and 2048. The number of DC tones may be 3 for all bandwidths (BWs). The number of pilot tones may be any of 16, 36, 56 and 76. The DFT period may be 194 nanoseconds (194 ns) or, equivalently, 0.194 μs. The GI may be 18.18 ns (short), 36.36 ns (normal) or 72.72 ns (long). The sampling clock rate may be any of 2640 MHz, 5280 MHz, 7920 MHz and 10560 MHz. FIG. 2 illustrates an example scenario 200 of IEEE 802.11ay EDMG channelizations in the 60 GHz band. FIG. 3 illustrates an example scenario 300 of channel BW and occupying BW of IEEE 802.1 lay EDMG.

Under various proposed schemes in accordance with the present disclosure, there may be some general considerations in the scalable waveform and numerology designs in the 60 GHz band. Under the proposed scheme, the IEEE 802.11ad/ay/aj DMG, EDMG or China millimeter-wave multi-gigabit (CMMG) channelizations may be reused in the 60 GHz band. Also, under the proposed scheme, there may be several considerations with respect to selection of subcarrier frequency spacing. For instance, selection of subcarrier frequency spacing may need to be large enough to reduce phase noise and intercarrier interference (ICI) effects. Additionally, selection of subcarrier frequency spacing may be performed without requiring a large fast Fourier transform (FFT) size. Moreover, a clock source compatible to existing IEEE 802.11 ax/be designs may be utilized. Furthermore, selection of subcarrier frequency spacing may need to be flexible for various application scenarios. Also, there may be multiple IEEE 802.11 be subcarrier frequency spacings (e.g., $\Delta F = \alpha * 78.125$ kHz, with a being a positive integer and denoting a scalable factor), and $N_{fft} * \Delta F = BW$ (with $N_{\mathit{fft}}$ denoting the number of FFT subcarriers). Under the proposed scheme, the design of GI may need to achieve efficiency in optimization and may be flexible to cover different channel delay profiles. Under the proposed scheme, IEEE 802.11 ac/ax/be designs may be reused as much as possible, such as tone plans, signaling, modulation and coding scheme (MCS), encoding, decoding, and so on. Moreover, in each of FIG. 4 FIG. 11 regarding the various designs according to the various proposed schemes described below, a number of pertinent parameters are proposed for each design. For each channel bandwidth under each design, the pertinent parameters may include, for example and without limitation, $\Delta F$ (subcarrier frequency spacing), $T_{\mathit{dft}}$ (OFDM symbol duration), $T_{gi}$ (GI duration), $T_{sym}$ (symbol duration), $F_s$ (sampling frequency), $N_{\mathit{fft}}$ (number of FFT subcarriers), $N_{sd}$ (number of data-carrying subcarriers), $N_{sp}$ (number of pilot-tone subcarriers), $N_{dc}$ (number of direct-current tones), $N_{st}$ (total number of subcarriers), $N_{guard}$ (number of guard tones), and tone plan.

Under a proposed scheme in accordance with the present disclosure with respect to numerology design, as a first option (Option 1-a), the channel BW may be kept as with IEEE 802.11 ay, such as 2160 MHz, 4320 MHz, 6480 MHz and 8640 MHz. For instance, the IEEE 802.11 be tone plan for the 80 MHz bandwidth (BW80M) may be mapped to the 2160 MHz bandwidth (BW2160M), the tone plan for 160 MHz bandwidth (BW160M) may be mapped to the 4320 MHz bandwidth (BW4320M), and so on. Under the proposed scheme, since 2160/80=27=3^3, and since subcarrier spacing of IEEE 802.11 be is $\Delta F_{eht}$=78.125 kHz, the subcarrier frequency spacing for the 60 GHz band may be defined as follows: $\Delta F$=78.125 kHz*3^3=2.109375 MHz. Accordingly, 2160 MHz=(78.125 kHz*3^3)*1024→RU996 tone plan of BW80M in IEEE 802.11be→occupied channel bandwidth (OCB)=2.1 GHz; 4320 MHz=(78.125 kHz*3^3)*2048→RU2*996 tone plan of BW160M in IEEE 802.11be→OCB=4.2 GHz; 6480 MHz=(78.125 kHz*3^3)*3072→RU3*996 tone plan of BW160M in IEEE 802.11 be→OCB=6.3 GHz; and 8640 MHz=(78.125 kHz*3^3)*4096→RU4*996 tone plan of BW160M in IEEE 802.11be→OCB=8.4 GHz. Moreover, under the proposed scheme, 540 MHz bandwidth (BW540M) and 1080 MHz bandwidth (BW1080M) may be defined as follows: 540 MHz=(78.125 kHz*3^3)*256→RU242 tone plan of BW20M in IEEE 802.11be→OCB=0.51 GHz; and 1080 MHz=(78.125 kHz*3^3)*512→RU484 tone plan of BW160M in IEEE 802.11 be→OCB=1.02 GHz. Furthermore, under the proposed scheme, there may be three GI options for utilization, as follows: for short GI, $T_{gi,\ short}=T_{\mathit{dft}}/32$, with $T_{gi}$ denoting a GI duration and $T_{\mathit{dft}}$ denoting an OFDM symbol duration; for normal GI, $T_{gi,\ normal}=T_{\mathit{dft}}/16$; and for long GI, $T_{gi,\ long}=T_{\mathit{dft}}/8$.

FIG. 4 illustrates an example design 400 with respect to numerology design under Option 1-a of the proposed scheme. FIG. 5 illustrates an example design 500 with respect to numerology design under an alternative of the first option (Option 1-b) of the proposed scheme. Generally speaking, Option 1-b is similar to Option 1-a but with an increased subcarrier spacing. That is, under Option 1-b, $\Delta F$=78.125 kHz*3^3*2=4.21875 MHz for the bandwidths of 1080 MHz, 2160 MHz, 4320 MHz, 6480 MHz and 8640 MHz while, for BW540M, the subcarrier frequency spacing may be kept as $\Delta F$=78.125 kHz*3^3=2.109375 MHz.

Under another proposed scheme in accordance with the present disclosure with respect to numerology design, as a second option (Option 2-a), similar OCB as that of IEEE 802.11 ay may be maintained to preserve similar guard band(s). In IEEE 802.11 ay, the OCB of BW2160M is about 1825 MHz. To map the tone plan for BW80M of IEEE 802.11 be to the frequency range of BW2160M and, at the same time, maintain the similar occupied BW, the subcarrier frequency spacing may be 1825 MHz/996=1.8323 MHz. Then, the BW may become 1024*1.8323 MHz=1876.3 MHz. To render the BW being a multiple of 80 MHz, the following design may be chosen: 80 MHz*ceil(1876.3/80)= 80 MHz*24=1920 MHz. Thus, the subcarrier frequency spacing may be as follows: $\Delta F$=1920 MHz/1024=1.875 MHz. Under the proposed scheme, since 1.875 MHz=78.125 kHz*24, the channel bandwidths of 1920 MHz (BW1920M), 3840 MHz (BW3840M), 5760 MHz (BW5760M) and 7680 MHz (BW7680M) in the 60 GHz band may be defined as follows: 1920 MHz=(78.125 kHz*3*2^3)*1024→RU996 tone plan of BW80M in IEEE 802.11be→OCB=1.8675 GHz; 3840 MHz=(78.125 kHz*3*2^3)*2048→RU2*996 tone plan of BW160M in IEEE 802.11 be→OCB=3.375 GHz; 5760 MHz=(78.125 kHz*3*2 ^3)*3072→RU3*996 tone plan of BW240M in IEEE 802.11 be→OCB=5.6025 GHz; and 7680 MHz= (78.125 kHz*3*2^3)*4096→RU4*996 tone plan of BW320M in IEEE 802.11 be→OCB=7.47 GHz. Moreover, under the proposed scheme, 480 MHz bandwidth (BW480M) and 960 MHz bandwidth (BW960M) may be defined as follows: 480 MHz=(78.125 kHz*3*2^3)* 256→RU242 tone plan of BW20M in IEEE 802.11be→OCB=0.45375 GHz; and 960 MHz=(78.125 kHz*3*2^3)*512→RU484 tone plan of BW40M in IEEE 802.11 be→OCB=0.9075 GHz. It is noteworthy that all the BW480M, BW960M, 1920 MHz bandwidth (BW1920M), 3840 MHz bandwidth (BW3840M), 5760 MHz bandwidth (BW5760M) and 7680 MHz bandwidth (BW7680M) may be multiples of 80 MHz or multiples of 160 MHz. Furthermore, under the proposed scheme, there may be three GI options for utilization, as follows: for short GI, $T_{gi,\ short}=T_{\mathit{dft}}/32$; for normal GI, $T_{gi,\ normal}=T_{\mathit{dft}}/16$; and for long GI, $T_{gi,\ long}=T_{\mathit{dft}}/8$.

FIG. 6 illustrates an example design 600 with respect to numerology design under Option 2-a of the proposed scheme. FIG. 7 illustrates an example design 700 with respect to numerology design under an alternative of the second option (Option 2-b) of the proposed scheme. Generally speaking, Option 2-b is similar to Option 2-a but with an increased subcarrier spacing. That is, under Option 2-b, $\Delta F$=78.125 kHz*48=3.75 MHz for the bandwidths of 1920 MHz, 3840 MHz, 5760 MHz and 7680 MHz while, for BW4800M and BW960M, the subcarrier frequency spacing may be kept as $\Delta F$=78.125 kHz*24=1.875 MHz.

Under yet another proposed scheme in accordance with the present disclosure with respect to numerology design, as a third option (Option 3-a), either the same channel BW as IEEE 802.11 ay or a similar OCB as that of IEEE 802.11 ay may be kept, thereby resulting in a subcarrier frequency spacing $\Delta F$=78.125 kHz*27 and a scalable factor α=27 for design Option-1 or $\Delta F$=78.125 kHz*24 and a scalable factor α=24 for design Option-2. In design Option 3-a, a scalable factor α=26 may be considered→$\Delta F$=78.125 kHz*26=2.03125 MHz. Accordingly, the channel bandwidths of 2080 MHz (BW2080M), 4160 MHz (BW4160M), 6240 MHz (BW6240M) and 8320 MHz (BW8320M) in the 60 GHz band may be defined as follows: 2080 MHz= (78.125 kHz*26)*1024→RU996 tone plan of BW80M in IEEE 802.11 be→OCB=2.023 GHz; 4160 MHz=(78.125 kHz*26)*2048→RU2*996 tone plan of BW160M in IEEE 802.11be→OCB=4.046 GHz; 6240 MHz=(78.125 kHz*26)* 3072→RU3*996 tone plan of BW240M in IEEE 802.11 be→OCB=6.070 GHz; and 8320 MHz=(78.125 kHz*26)*4096→RU4*996 tone plan of BW320M in IEEE 802.11be→OCB=8.093 GHz. Moreover, under the proposed scheme, 520 MHz bandwidth (BW520M) and 1040 MHz bandwidth (BW1040M) may be defined as follows: 520 MHz=(78.125 kHz*26)*256→RU242 tone plan of BW20M in IEEE 802.11 be→OCB=0.492 GHz; and 1040 MHz=(78.125 kHz*26)*512→RU484 tone plan of BW40M in IEEE 802.11 be→OCB=0.983 GHz. Furthermore, under the proposed scheme, there may be three GI options for utilization, as follows: for short GI, $T_{gi,\ short}=T_{dft}/32$; for normal GI, $T_{gi,\ normal}=T_{dft}/16$; and for long GI, $T_{gi,\ long}=T_{dft}/8$.

FIG. 8 illustrates an example design 800 with respect to numerology design under Option 3-a of the proposed scheme. FIG. 9 illustrates an example design 900 with respect to numerology design under an alternative of the third option (Option 3-b) of the proposed scheme. Generally speaking, Option 3-b is similar to Option 3-a but with an increased subcarrier spacing. That is, under Option 3-b, $\Delta F=78.125$ kHz*52=4.0625 MHz for the bandwidths of 1040 MHz, 2080 MHz, 4160 MHz, 6240 MHz and 8320 MHz while, for BW520M, the subcarrier frequency spacing may be kept as $\Delta F=78.125$ kHz*26=2.03125 MHz.

Under still another proposed scheme in accordance with the present disclosure with respect to numerology design, as a fourth option (Option 4-a), and a scalable factor $\alpha=25$ may be considered, and thus the subcarrier frequency spacing may be $\Delta F=78.125$ kHz*25=1.953125 MHz. Accordingly, the channel bandwidths of 2000 MHz (BW2000M), 4000 MHz (BW4000M), 6000 MHz (BW6000M) and 8000 MHz (BW8000M) in the 60 GHz band may be defined as follows: 2000 MHz=(78.125 kHz*25)*1024→RU996 tone plan of BW80M in IEEE 802.11 be→OCB=1.945 GHz; 4000 MHz=(78.125 kHz*25)*2048→RU2*996 tone plan of BW160M in IEEE 802.11 be→OCB=3.890 GHz; 6000 MHz=(78.125 kHz*25)*3072→RU3*996 tone plan of BW240M in IEEE 802.11be→OCB=5.836 GHz; and 8000 MHz=(78.125 kHz*25)*4096→RU4*996 tone plan of BW320M in IEEE 802.11 be→OCB=7.781 GHz. Moreover, under the proposed scheme, 500 MHz bandwidth (BW500M) and 1000 MHz bandwidth (BW1000M) may be defined as follows: 500 MHz=(78.125 kHz*25)*256→RU242 tone plan of BW20M in IEEE 802.11be→OCB=0.473 GHz; and 1000 MHz=(78.125 kHz*25)*512→RU484 tone plan of BW40M in IEEE 802.11 be→OCB=0.945 GHz. Furthermore, under the proposed scheme, there may be three GI options for utilization, as follows: for short GI, $T_{gi,\ short}=T_{dft}/32$; for normal GI, $T_{gi,\ normal}=T_{dft}/16$; and for long GI, $T_{gi,\ long}=T_{dft}/8$.

FIG. 10 illustrates an example design 1000 with respect to numerology design under Option 4-a of the proposed scheme. FIG. 11 illustrates an example design 1100 with respect to numerology design under an alternative of the fourth option (Option 4-b) of the proposed scheme. Generally speaking, Option 4-b is similar to Option 4-a but with an increased subcarrier spacing. That is, under Option 4-b, $\Delta F=78.125$ kHz*50=3.90625 MHz for the bandwidths of 2000 MHz, 4000 MHz, 6000 MHz and 8000 MHz while, for BW500M and BW1000M, the subcarrier frequency spacing may be kept as $\Delta F=78.125$ kHz*25=1.953125 MHz.

Illustrative Implementations

Figure 12:
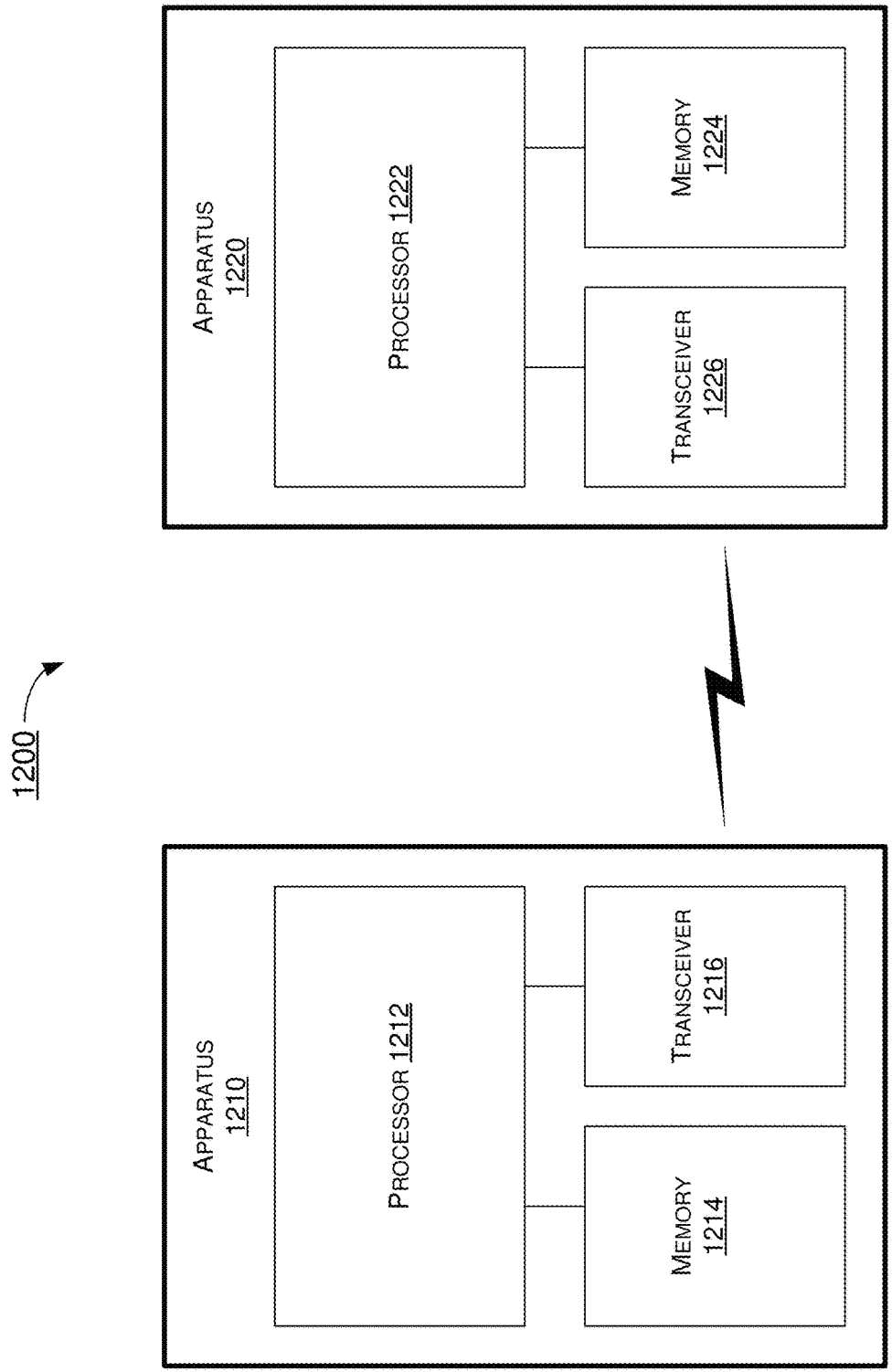
FIG. 12 is a block diagram of an example communication system in accordance with an implementation of the present disclosure.

FIG. 12 illustrates an example system 1200 having at least an example apparatus 1210 and an example apparatus 1220 in accordance with an implementation of the present disclosure. Each of apparatus 1210 and apparatus 1220 may perform various functions to implement schemes, techniques, processes and methods described herein pertaining to scalable waveform and numerology designs for next-generation WLANs in 60 GHz, including the various schemes described above with respect to various proposed designs, concepts, schemes, systems and methods described above as well as processes described below. For instance, apparatus 1210 may be implemented in STA 110 and apparatus 1220 may be implemented in STA 120, or vice versa.

Each of apparatus 1210 and apparatus 1220 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 1210 and apparatus 1220 may be implemented in a smartphone, a smart watch, a personal digital assistant, a digital camera, or a computing equipment such as a tablet computer, a laptop computer or a notebook computer. Each of apparatus 1210 and apparatus 1220 may also be a part of a machine type apparatus, which may be an IoT apparatus such as an immobile or a stationary apparatus, a home apparatus, a wire communication apparatus or a computing apparatus. For instance, each of apparatus 1210 and apparatus 1220 may be implemented in a smart thermostat, a smart fridge, a smart door lock, a wireless speaker or a home control center. When implemented in or as a network apparatus, apparatus 1210 and/or apparatus 1220 may be implemented in a network node, such as an AP in a WLAN.

In some implementations, each of apparatus 1210 and apparatus 1220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1210 and apparatus 1220 may be implemented in or as a STA or an AP. Each of apparatus 1210 and apparatus 1220 may include at least some of those components shown in FIG. 12 such as a processor 1212 and a processor 1222, respectively, for example. Each of apparatus 1210 and apparatus 1220 may further include one or more other components not pertinent to the proposed scheme of the present disclosure (e.g., internal power supply, display device and/or user interface device), and, thus, such component(s) of apparatus 1210 and apparatus 1220 are neither shown in FIG. 12 nor described below in the interest of simplicity and brevity.

In one aspect, each of processor 1212 and processor 1222 may be implemented in the form of one or more single-core processors, one or more multi-core processors, one or more RISC processors or one or more CISC processors. That is, even though a singular term "a processor" is used herein to refer to processor 1212 and processor 1222, each of processor 1212 and processor 1222 may include multiple processors in some implementations and a single processor in other implementations in accordance with the present disclosure. In another aspect, each of processor 1212 and processor 1222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1212 and processor 1222 is a special-purpose machine specifically designed, arranged and configured to perform specific tasks including those pertaining to scalable waveform and numerology designs for next-generation WLANs in 60 GHz in accordance with various implementations of the present disclosure.

In some implementations, apparatus 1210 may also include a transceiver 1216 coupled to processor 1212. Transceiver 1216 may include a transmitter capable of wirelessly transmitting and a receiver capable of wirelessly receiving data. In some implementations, apparatus 1220 may also include a transceiver 1226 coupled to processor 1222. Transceiver 1226 may include a transmitter capable of wirelessly transmitting and a receiver capable of wirelessly receiving data. It is noteworthy that, although transceiver 1216 and transceiver 1226 are illustrated as being external to and separate from processor 1212 and processor 1222, respectively, in some implementations, transceiver 1216 may be an integral part of processor 1212 as a system on chip (SoC), and transceiver 1226 may be an integral part of processor 1222 as a SoC.

In some implementations, apparatus 1210 may further include a memory 1214 coupled to processor 1212 and capable of being accessed by processor 1212 and storing data therein. In some implementations, apparatus 1220 may further include a memory 1224 coupled to processor 1222 and capable of being accessed by processor 1222 and storing data therein. Each of memory 1214 and memory 1224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1214 and memory 1224 may include a type of read-only memory (ROM) such as mask ROM, programmable ROM (PROM), erasable programmable ROM (EPROM) and/or electrically erasable programmable ROM (EEPROM). Alternatively, or additionally, each of memory 1214 and memory 1224 may include a type of non-volatile random-access memory (NVRAM) such as flash memory, solid-state memory, ferroelectric RAM (FeRAM), magnetoresistive RAM (MRAM) and/or phase-change memory.

Each of apparatus 1210 and apparatus 1220 may be a communication entity capable of communicating with each other using various proposed schemes in accordance with the present disclosure. For illustrative purposes and without limitation, a description of capabilities of apparatus 1210, as STA 110, and apparatus 1220, as STA 120, is provided below. It is noteworthy that, although a detailed description of capabilities, functionalities and/or technical features of apparatus 1220 is provided below, the same may be applied to apparatus 1210 although a detailed description thereof is not provided solely in the interest of brevity. It is also noteworthy that, although the example implementations described below are provided in the context of WLAN, the same may be implemented in other types of networks.

Under various proposed schemes pertaining to scalable waveform and numerology designs for next-generation WLANs in 60 GHz in accordance with the present disclosure, with apparatus 1210 implemented in or as STA 110 and apparatus 1220 implemented in or as STA 120 in network environment 100, processor 1212 of apparatus 1210 may communicate, via transceiver 1216, in a 60 GHz band wirelessly with apparatus 1220 by either or both: (a) transmitting first data or first information to the second apparatus; and (b) receiving second data or second information from the second apparatus. In communicating in the 60 GHz band wirelessly, processor 1212 may communicate in the 60 GHz band wirelessly based on a specific numerology design with at least one of: (i) selection of a specific subcarrier frequency spacing; (ii) selection of a specific GI design; and (iii) reuse of a preexisting channelization or tone plan.

In some implementations, the selection of the specific subcarrier frequency spacing may involve selection of a subcarrier frequency spacing ($\Delta F$) which is a multiple of an IEEE 802.11 be subcarrier frequency spacing such that $\Delta F=\alpha*78.125$ kHz or a multiple of an IEEE 802.11 ac subcarrier frequency spacing such that $\Delta F=\alpha*312.5$ kHz, with a being a positive integer and denoting a scalable factor.

In some implementations, the selection of the specific GI design may involve selection of a GI from a plurality of options including the following: a short GI with $T_{gi,\ short}=T_{dft}/32$, a normal GI with $T_{gi,\ normal}=T_{dft}/16$, and a long GI with $T_{gi,\ long}=T_{dft}/8$, with $T_{gi}$ denoting a GI duration and $T_{dft}$ denoting an OFDM symbol duration.

In some implementations, the reuse of the preexisting channelization or tone plan may involve reuse of an IEEE 802.11 ac, IEE 802.11 ax, IEEE 802.11 ay or IEEE 802.11 be channelization or tone plan.

In some implementations, under Option-1a, the specific numerology design may include the following: (a) for a 540 MHz channel bandwidth, mapping a single 242-tone resource unit (RU242) tone plan of a 20 MHz bandwidth according to IEEE 802.11be to the 540 MHz channel bandwidth for an OCB of 0.51 GHz; (b) for a 1080 MHz channel bandwidth, mapping a single 484-tone resource unit (RU484) tone plan of a 40 MHz bandwidth according to IEEE 802.11be to the 1080 MHz channel bandwidth for an OCB of 1.02 GHz; (c) for a 2160 MHz channel bandwidth, mapping a single 996-tone resource unit (RU996) tone plan of an 80 MHz bandwidth according to IEEE 802.11be to the 2160 MHz channel bandwidth for an OCB of 2.1 GHz; (d) for a 4320 MHz channel bandwidth, mapping two 996-tone resource units (RU2*996) tone plan of a 160 MHz bandwidth according to IEEE 802.11be to the 4320 MHz channel bandwidth for an OCB of 4.2 GHz; (e) for a 6480 MHz channel bandwidth, mapping three 996-tone resource units (RU3*996) tone plan of a 240 MHz bandwidth according to IEEE 802.11 be to the 6480 MHz channel bandwidth for an OCB of 6.3 GHz; and (f) for a 8640 MHz channel bandwidth, mapping four 996-tone resource units (RU4*996) tone plan of a 320 MHz bandwidth according to IEEE 802.11be to the 8640 MHz channel bandwidth for an OCB of 8.4 GHz.

In some implementations, under Option-1a and design 400, the specific numerology design may include at least the following: (a) for a 540 MHz channel bandwidth, selecting $\Delta F=2.109375$ MHz, $T_{dft}=0.474$ µs, $T_{gi,\ short}=0.015$ µs, $T_{gi,\ normal}=0.030$ µs, $T_{gi,\ long}=0.059$ µs, $T_{sym}=T_{dft}+T_{gi}$, $F_s=540$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1080 MHz channel bandwidth, selecting $\Delta F=2.109375$ MHz, $T_{dft}=0.474$ µs, $T_{gi,\ short}=0.015$ µs, $T_{gi,\ normal}=0.030$ µs, $T_{gi,\ long}=0.059$ µs, $T_{sym}=T_{dft}+T_{gi}$, $F_s=1080$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2160 MHz channel bandwidth, selecting $\Delta F=2.109375$ MHz, $T_{dft}=0.474$ µs, $T_{gi,\ short}=0.015$ µs, $T_{gi,\ normal}=0.030$ µs, $T_{gi,\ long}=0.059$ µs, $T_{sym}=T_{dft}+T_{gi}$, $F_s=2160$ MHz, $N_{fft}=1024$, $N_{sd}=980$, $N_{sp}=16$, $N_{dc}=5$, $N_{st}=996$, $N_{guard}=(12, 11)$, and a tone plan for a 996-tone resource unit (RU996).

In some implementations, under Option-1b and design 500, the specific numerology design may include at least the following: (a) for a 540 MHz channel bandwidth, selecting $\Delta F=2.109375$ MHz, $T_{dft}=0.474$ µs, $T_{gi,\ short}=0.015$ µs, $T_{gi,\ normal}$=0.030 µs, $T_{gi,\ long}$=0.059 µs, $T_{sym}$=$T_{dft}$+$T_{gi}$, $F_s$=540 MHz, $N_{fft}$=256, $N_{sd}$=234, $N_{sp}$=8, $N_{dc}$=3, $N_{st}$=242, $N_{guard}$=(6, 5), and a tone plan for a 242-tone resource unit (RU242); (b) for a 1080 MHz channel bandwidth, selecting ΔF=4.21875 MHz, $T_{dft}$ 0.237 µs, $T_{gi,\ short}$=0.015 µs, $T_{gi,\ normal}$=0.030 µs, $T_{gi,\ long}$=0.059 µs, $T_{sym}$=$T_{dft}$+$T_{gi}$, $F_s$=1080 MHz, $N_{fft}$=256, $N_{sd}$=234, $N_{sp}$=8, $N_{dc}$=3, $N_{st}$=242, $N_{guard}$=(6, 5), and a tone plan for RU242; and (c) for a 2160 MHz channel bandwidth, selecting ΔF=4.21875 MHz, $T_{dft}$=0.237 µs, $T_{gi,\ short}$=0.015 µs, $T_{gi,\ normal}$=0.030 µs, $T_{gi,\ long}$=0.059 µs, $T_{sym}$=$T_{dft}$+$T_{gi}$, $F_s$=2160 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484).

In some implementations, under Option-2a, the specific numerology design may include the following: (a) for a 480 MHz channel bandwidth, mapping a single 242-tone resource unit (RU242) tone plan of a 20 MHz bandwidth according to IEEE 802.11ax or 802.11 be to the 480 MHz channel bandwidth for an OCB of 0.45375 GHz; (b) for a 960 MHz channel bandwidth, mapping a single 484-tone resource unit (RU484) tone plan of a 40 MHz bandwidth according to IEEE 802.11 ax or 802.11 be to the 960 MHz channel bandwidth for an OCB of 0.9075 GHz; (c) for a 1920 MHz channel bandwidth, mapping a single 996-tone resource unit (RU996) tone plan of an 80 MHz bandwidth according to IEEE 802.11ax or 802.11be to the 1920 MHz channel bandwidth for an OCB of 1.8675 GHz; (d) for a 3840 MHz channel bandwidth, mapping two 996-tone resource units (RU2*996) tone plan of a 160 MHz bandwidth according to IEEE 802.11ax or 802.11be to the 3840 MHz channel bandwidth for an OCB of 3.375 GHz; (e) for a 5760 MHz channel bandwidth, mapping three 996-tone resource units (RU3*996) tone plan of a 240 MHz bandwidth according to IEEE 802.11 be to the 5760 MHz channel bandwidth for an OCB of 5.6025 GHz; and (f) for a 7680 MHz channel bandwidth, mapping four 996-tone resource units (RU4*996) tone plan of a 320 MHz bandwidth according to IEEE 802.11 be to the 7680 MHz channel bandwidth for an OCB of 7.47 GHz.

In some implementations, under Option-2a and design 600, the specific numerology design may include at least the following: (a) for a 480 MHz channel bandwidth, selecting ΔF=1.875 MHz, $T_{dft}$=0.533 µs, $T_{gi,\ short}$=0.017 µs, $T_{gi,\ normal}$=0.033 µs, $T_{gi,\ long}$=0.067 µs, $T_{sym}$=$T_{dft}$+$T_{gi}$, $F_s$=480 MHz, $N_{fft}$=256, $N_{sd}$=234, $N_{sp}$=8, $N_{dc}$=3, $N_{st}$=242, $N_{guard}$=(6, 5), and a tone plan for a 242-tone resource unit (RU242); (b) for a 960 MHz channel bandwidth, selecting ΔF=1.875 MHz, $T_{dft}$=0.533 µs, $T_{gi,\ short}$=0.017 µs, $T_{gi,\ normal}$=0.033 µs, $T_{gi,\ long}$=0.067 µs, $T_{sym}$=$T_{dft}$+$T_{gi}$, $F_s$=960 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and (c) for a 1920 MHz channel bandwidth, selecting ΔF=1.875 MHz, $T_{dft}$=0.533 µs, $T_{gi,\ short}$=0.017 µs, $T_{gi,\ normal}$=0.033 µs, $T_{gi,\ long}$=0.067 µs, $T_{sym}$=$T_{dft}$+$T_{gi}$, $F_s$=1920 MHz, $N_{fft}$=1024, $N_{sd}$=980, $N_{sp}$=16, $N_{dc}$=5, $N_{st}$=996, $N_{guard}$=(12, 11), and a tone plan for a 996-tone resource unit (RU996).

In some implementations, under Option-2b and design 700, the specific numerology design may include at least the following: (a) for a 480 MHz channel bandwidth, selecting ΔF=1.875 MHz, $T_{dft}$=0.533 µs, $T_{gi,\ short}$=0.017 µs, $T_{gi,\ normal}$=0.033 µs, $T_{gi,\ long}$=0.067 µs, $T_{sym}$=$T_{dft}$+$T_{gi}$, $F_s$=480 MHz, $N_{fft}$=256, $N_{sd}$=234, $N_{sp}$=8, $N_{dc}$=3, $N_{st}$=242, $N_{guard}$=(6, 5), and a tone plan for a 242-tone resource unit (RU242); (b) for a 960 MHz channel bandwidth, selecting ΔF=1.875 MHz, $T_{dft}$=0.533 µs, $T_{gi,\ short}$=0.017 µs, $T_{gi,\ normal}$=0.033 µs, $T_{gi,\ long}$=0.067 µs, $T_{sym}$=$T_{dft}$+$T_{gi}$, $F_s$=960 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and (c) for a 1920 MHz channel bandwidth, selecting ΔF=3.75 MHz, $T_{dft}$=0.267 µs, $T_{gi,\ short}$=0.017 µs, $T_{gi,\ normal}$=0.033 µs, $T_{gi,\ long}$=0.067 µs, $T_{sym}$=$T_{dft}$+$T_{gi}$, $F_s$=1920 MHz, $N_{fft}$=512, $N_{sd}$=468, $N_{sp}$=16, $N_{dc}$=5, $N_{st}$=484, $N_{guard}$=(12, 11), and a tone plan for RU484.

In some implementations, under Option-3a, the specific numerology design may include the following: (a) for a 520 MHz channel bandwidth, mapping a single 242-tone resource unit (RU242) tone plan of a 20 MHz bandwidth according to IEEE 802.11 ax or 802.11 be to the 520 MHz channel bandwidth for an OCB of 0.492 GHz; (b) for a 1040 MHz channel bandwidth, mapping a single 484-tone resource unit (RU484) tone plan of a 40 MHz bandwidth according to IEEE 802.11ax or 802.11be to the 1040 MHz channel bandwidth for an OCB of 0.983 GHz; (c) for a 2080 MHz channel bandwidth, mapping a single 996-tone resource unit (RU996) tone plan of an 80 MHz bandwidth according to IEEE 802.11ax or 802.11be to the 2080 MHz channel bandwidth for an OCB of 2.023 GHz; (d) for a 4160 MHz channel bandwidth, mapping two 996-tone resource units (RU2*996) tone plan of a 160 MHz bandwidth according to IEEE 802.11ax or 802.11be to the 4160 MHz channel bandwidth for an OCB of 4.046 GHz; (e) for a 6240 MHz channel bandwidth, mapping three 996-tone resource units (RU3*996) tone plan of a 240 MHz bandwidth according to IEEE 802.11 be to the 6240 MHz channel bandwidth for an OCB of 6.070 GHz; and (f) for a 8320 MHz channel bandwidth, mapping four 996-tone resource units (RU4*996) tone plan of a 320 MHz bandwidth according to IEEE 802.11 be to the 8320 MHz channel bandwidth for an OCB of 8.093 GHz.

In some implementations, under Option-3a and design 800, the specific numerology design may include at least the following: (a) for a 520 MHz channel bandwidth, selecting ΔF=2.03125 MHz, $T_{dft}$=0.492 µs, $T_{gi,\ short}$=0.015 µs, $T_{gi,\ normal}$=0.031 µs, $T_{gi,\ long}$=0.062 µs, $T_{sym}$=$T_{dft}$+$T_{gi}$, $F_s$=520 MHz, $N_{fft}$=256, $N_{sd}$=234, $N_{sp}$=8, $N_{dc}$=3, $N_{st}$=242, $N_{guard}$=(6, 5), and a tone plan for a 242-tone resource unit (RU242); (b) for a 1040 MHz channel bandwidth, selecting ΔF=2.03125 MHz, $T_{dft}$=0.492 µs, $T_{gi,\ short}$=0.015 µs, $T_{gi,\ normal}$=0.031 µs, $T_{gi,\ long}$=0.062 µs, $T_{sym}$=$T_{dft}$+$T_{gi}$, $F_s$=1040 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and (c) for a 2080 MHz channel bandwidth, selecting ΔF=2.03125 MHz, $T_{dft}$=0.492 µs, $T_{gi,\ short}$=0.015 µs, $T_{gi,\ normal}$=0.031 µs, $T_{gi,\ long}$=0.062 µs, $T_{sym}$=$T_{dft}$+$T_{gi}$, $F_s$=2080 MHz, $N_{fft}$=1024, $N_{sd}$=980, $N_{sp}$=16, $N_{dc}$=5, $N_{st}$=996, $N_{guard}$=(12, 11), and a tone plan for a 996-tone resource unit (RU996).

In some implementations, under Option-3b and design 900, the specific numerology design may include at least the following: (a) for a 520 MHz channel bandwidth, selecting ΔF=2.03125 MHz, $T_{dft}$=0.492 µs, $T_{gi,\ short}$=0.015 µs, $T_{gi,\ normal}$=0.031 µs, $T_{gi,\ long}$=0.062 µs, $T_{sym}$=$T_{dft}$+$T_{gi}$, $F_s$=520 MHz, $N_{fft}$=256, $N_{sd}$=234, $N_{sp}$=8, $N_{dc}$=3, $N_{st}$=242, $N_{guard}$=(6, 5), and a tone plan for a 242-tone resource unit (RU242); (b) for a 1040 MHz channel bandwidth, selecting ΔF=4.0625 MHz, $T_{dft}$=0.246 µs, $T_{gi,\ short}$=0.015 µs, $T_{gi,\ normal}$=0.031 µs, $T_{gi,\ long}$=0.062 µs, $T_{sym}$=$T_{dft}$+$T_{gi}$, $F_s$=1040 MHz, $N_{fft}$=256, $N_{sd}$=234, $N_{sp}$=8, $N_{dc}$=3, $N_{st}$=242, $N_{guard}$=(6, 5), and a tone plan for RU242; and (c) for a 2080 MHz channel bandwidth, selecting ΔF=4.0625 MHz, $T_{dft}$=0.246 µs, $T_{gi,\ short}$=0.015 µs, $T_{gi,\ normal}$=0.031 µs, $T_{gi,\ long}$=0.062 µs, $T_{sym}$=$T_{dft}$+$T_{gi}$, $F_s$=2080 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484).

In some implementations, under Option-4a, the specific numerology design may include the following: (a) for a 500 MHz channel bandwidth, mapping a single 242-tone resource unit (RU242) tone plan of a 20 MHz bandwidth according to IEEE 802.11 ax or 802.11 be to the 500 MHz channel bandwidth for an OCB of 0.473 GHz; (b) for a 1000 MHz channel bandwidth, mapping a single 484-tone resource unit (RU484) tone plan of a 40 MHz bandwidth according to IEEE 802.11ax or 802.11be to the 1000 MHz channel bandwidth for an OCB of 0.945 GHz; (c) for a 2000 MHz channel bandwidth, mapping a single 996-tone resource unit (RU996) tone plan of an 80 MHz bandwidth according to IEEE 802.11ax or 802.11be to the 2000 MHz channel bandwidth for an OCB of 1.945 GHz; (d) for a 4000 MHz channel bandwidth, mapping two 996-tone resource units (RU2*996) tone plan of a 160 MHz bandwidth according to IEEE 802.11ax or 802.11be to the 4000 MHz channel bandwidth for an OCB of 3.890 GHz; (e) for a 6000 MHz channel bandwidth, mapping three 996-tone resource units (RU3*996) tone plan of a 240 MHz bandwidth according to IEEE 802.11 be to the 6000 MHz channel bandwidth for an OCB of 5.836 GHz; and (f) for a 8000 MHz channel bandwidth, mapping four 996-tone resource units (RU4*996) tone plan of a 320 MHz bandwidth according to IEEE 802.11 be to the 8000 MHz channel bandwidth for an OCB of 7.781 GHz.

In some implementations, under Option-4a and design 1000, the specific numerology design may include at least the following: (a) for a 500 MHz channel bandwidth, selecting $\Delta F=1.953125$ MHz, $T_{dft}=0.512$ µs, $T_{gi, short}=0.016$ µs, $T_{gi, normal}=0.032$ µs, $T_{gi, long}=0.064$ µs, $T_{sym}=T_{dft}+T_{gi}$, $F_s=500$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1000 MHz channel bandwidth, selecting $\Delta F=1.953125$ MHz, $T_{dft}=0.512$ µs, $T_{gi, short}=0.016$ µs, $T_{gi, normal}=0.032$ µs, $T_{gi, long}=0.064$ µs, $T_{sym}=T_{dft}+T_{gi}$, $F_s=1000$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2000 MHz channel bandwidth, selecting $\Delta F=1.953125$ MHz, $T_{dft}=0.512$ µs, $T_{gi, short}=0.016$ µs, $T_{gi, normal}=0.032$ µs, $T_{gi, long}=0.064$ µs, $T_{sym}=T_{dft}+T_{gi}$, $F_s=2000$ MHz, $N_{fft}=1024$, $N_{sd}=980$, $N_{sp}=16$, $N_{dc}=5$, $N_{st}=996$, $N_{guard}=(12, 11)$, and a tone plan for a 996-tone resource unit (RU996).

In some implementations, under Option-4b and design 1100, the specific numerology design may include at least the following: (a) for a 500 MHz channel bandwidth, selecting $\Delta F=1.953125$ MHz, $T_{dft}=0.512$ µs, $T_{gi, short}=0.016$ µs, $T_{gi, normal}=0.032$ µs, $T_{gi, long}=0.064$ µs, $T_{sym}=T_{dft}+T_{gi}$, $F_s=500$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1000 MHz channel bandwidth, selecting $\Delta F=1.953125$ MHz, $T_{dft}=0.512$ µs, $T_{gi, short}=0.016$ µs, $T_{gi, normal}=0.032$ µs, $T_{gi, long}=0.064$ µs, $T_{sym}=T_{dft}+T_{gi}$, $F_s=1000$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2000 MHz channel bandwidth, selecting $\Delta F=3.90625$ MHz, $T_{dft}=0.256$ µs, $T_{gi, short}=0.016$ µs, $T_{gi, normal}=0.032$ µs, $T_{gi, long}=0.064$ µs, $T_{sym}=T_{dft}+T_{gi}$, $F_s=2000$ MHz, $N_{fft}=512$, $N_{sd}=468$, $N_{sp}=16$, $N_{dc}=5$, $N_{st}=996$, $N_{guard}=(12, 11)$, and a tone plan for RU484.

Illustrative Processes

Figure 13:
FIG. 13 is a flowchart of an example process in accordance with an implementation of the present disclosure.

FIG. 13 illustrates an example process 1300 in accordance with an implementation of the present disclosure. Process 1300 may represent an aspect of implementing various proposed designs, concepts, schemes, systems and methods described above. More specifically, process 1300 may represent an aspect of the proposed concepts and schemes pertaining to scalable waveform and numerology designs for next-generation WLANs in 60 GHz in accordance with the present disclosure. Process 1300 may include one or more operations, actions, or functions as illustrated by one or more of blocks 1310 as well as sub-blocks 1312 and 1314. Although illustrated as discrete blocks, various blocks of process 1300 may be divided into additional blocks, combined into fewer blocks, or eliminated, depending on the desired implementation. Moreover, the blocks/sub-blocks of process 1300 may be executed in the order shown in FIG. 13 or, alternatively in a different order. Furthermore, one or more of the blocks/sub-blocks of process 1300 may be executed repeatedly or iteratively. Process 1300 may be implemented by or in apparatus 1210 and apparatus 1220 as well as any variations thereof. Solely for illustrative purposes and without limiting the scope, process 1300 is described below in the context of apparatus 1210 implemented in or as STA 110 functioning as a non-AP STA and apparatus 1220 implemented in or as STA 120 functioning as an AP STA of a wireless network such as a WLAN in network environment 100 in accordance with one or more of IEEE 802.11 standards. Process 1300 may begin at block 1310.

At 1310, process 1300 may involve processor 1212 of apparatus 1210 communicating, via transceiver 1216, in a 60 GHz band wirelessly with apparatus 1220 by either or both: (a) transmitting first data or first information to the second apparatus; and (b) receiving second data or second information from the second apparatus. In communicating in the 60 GHz band wirelessly, process 1300 may involve processor 1212 communicating in the 60 GHz band wirelessly based on a specific numerology design with at least one of: (i) selection of a specific subcarrier frequency spacing; (ii) selection of a specific GI design; and (iii) reuse of a preexisting channelization or tone plan.

In some implementations, the selection of the specific subcarrier frequency spacing may involve selection of a subcarrier frequency spacing ($\Delta F$) which is a multiple of an IEEE 802.11 be subcarrier frequency spacing such that $\Delta F=\alpha*78.125$ kHz or a multiple of an IEEE 802.11 ac subcarrier frequency spacing such that $\Delta F=\alpha*312.5$ kHz, with α being a positive integer and denoting a scalable factor.

In some implementations, the selection of the specific GI design may involve selection of a GI from a plurality of options including the following: a short GI with $T_{gi, short}=T_{dft}/32$, a normal GI with $T_{gi, normal}=T_{dft}/16$, and a long GI with $T_{gi, long}=T_{dft}/8$, with $T_{gi}$ denoting a GI duration and $T_{dft}$ denoting an OFDM symbol duration.

In some implementations, the reuse of the preexisting channelization or tone plan may involve reuse of an IEEE 802.11 ac, IEE 802.11 ax, IEEE 802.11 ay or IEEE 802.11 be channelization or tone plan.

In some implementations, under Option-1a, the specific numerology design may include the following: (a) for a 540 MHz channel bandwidth, mapping a single 242-tone resource unit (RU242) tone plan of a 20 MHz bandwidth according to IEEE 802.11be to the 540 MHz channel bandwidth for an OCB of 0.51 GHz; (b) for a 1080 MHz channel bandwidth, mapping a single 484-tone resource unit (RU484) tone plan of a 40 MHz bandwidth according to IEEE 802.11be to the 1080 MHz channel bandwidth for an OCB of 1.02 GHz; (c) for a 2160 MHz channel bandwidth, mapping a single 996-tone resource unit (RU996) tone plan of an 80 MHz bandwidth according to IEEE 802.11be to the 2160 MHz channel bandwidth for an OCB of 2.1 GHz; (d) for a 4320 MHz channel bandwidth, mapping two 996-tone resource units (RU2*996) tone plan of a 160 MHz bandwidth according to IEEE 802.11be to the 4320 MHz channel bandwidth for an OCB of 4.2 GHz; (e) for a 6480 MHz channel bandwidth, mapping three 996-tone resource units (RU3*996) tone plan of a 240 MHz bandwidth according to IEEE 802.11 be to the 6480 MHz channel bandwidth for an OCB of 6.3 GHz; and (f) for a 8640 MHz channel bandwidth, mapping four 996-tone resource units (RU4*996) tone plan of a 320 MHz bandwidth according to IEEE 802.11be to the 8640 MHz channel bandwidth for an OCB of 8.4 GHz.

In some implementations, under Option-1a and design 400, the specific numerology design may include at least the following: (a) for a 540 MHz channel bandwidth, selecting $\Delta F=2.109375$ MHz, $T_{dft}=0.474$ μs, $T_{gi,\ short}=0.015$ μs, $T_{gi,\ normal}=0.030$ μs, $T_{gi,\ long}=0.059$ μs, $T_{sym}=T_{dft}+T_{gi}$, $F_s=540$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1080 MHz channel bandwidth, selecting $\Delta F=2.109375$ MHz, $T_{dft}=0.474$ μs, $T_{gi,\ short}=0.015$ μs, $T_{gi,\ normal}=0.030$ μs, $T_{gi,\ long}=0.059$ μs, $T_{sym}=T_{dft}+T_{gi}$, $F_s=1080$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2160 MHz channel bandwidth, selecting $\Delta F=2.109375$ MHz, $T_{dft}=0.474$ μs, $T_{gi,\ short}=0.015$ μs, $T_{gi,\ normal}=0.030$ μs, $T_{gi,\ long}=0.059$ μs, $T_{sym}=T_{dft}+T_{gi}$, $F_s=2160$ MHz, $N_{fft}=1024$, $N_{sd}=980$, $N_{sp}=16$, $N_{dc}=5$, $N_{st}=996$, $N_{guard}=(12, 11)$, and a tone plan for a 996-tone resource unit (RU996).

In some implementations, under Option-1b and design 500, the specific numerology design may include at least the following: (a) for a 540 MHz channel bandwidth, selecting $\Delta F=2.109375$ MHz, $T_{dft}=0.474$ μs, $T_{gi,\ short}=0.015$ μs, $T_{gi,\ normal}=0.030$ μs, $T_{gi,\ long}=0.059$ μs, $T_{sym}=T_{dft}+T_{gi}$, $F_s=540$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1080 MHz channel bandwidth, selecting $\Delta F=4.21875$ MHz, $T_{dft}$ 0.237 μs, $T_{gi,\ short}=0.015$ μs, $T_{gi,\ normal}=0.030$ μs, $T_{gi,\ long}=0.059$ μs, $T_{sym}=T_{dft}+T_{gi}$, $F_s=1080$ MHz, $N_{fft}=256$, $N_{sd}=234$, $N_{sp}=8$, $N_{dc}=3$, $N_{st}=242$, $N_{guard}=(6, 5)$, and a tone plan for RU242; and (c) for a 2160 MHz channel bandwidth, selecting $\Delta F=4.21875$ MHz, $T_{dft}=0.237$ μs, $T_{gi,\ short}=0.015$ μs, $T_{gi,\ normal}=0.030$ μs, $T_{gi,\ long}=0.059$ μs, $T_{sym}=T_{dft}+T_{gi}$, $F_s=2160$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484).

In some implementations, under Option-2a, the specific numerology design may include the following: (a) for a 480 MHz channel bandwidth, mapping a single 242-tone resource unit (RU242) tone plan of a 20 MHz bandwidth according to IEEE 802.11ax or 802.11 be to the 480 MHz channel bandwidth for an OCB of 0.45375 GHz; (b) for a 960 MHz channel bandwidth, mapping a single 484-tone resource unit (RU484) tone plan of a 40 MHz bandwidth according to IEEE 802.11 ax or 802.11 be to the 960 MHz channel bandwidth for an OCB of 0.9075 GHz; (c) for a 1920 MHz channel bandwidth, mapping a single 996-tone resource unit (RU996) tone plan of an 80 MHz bandwidth according to IEEE 802.11ax or 802.11be to the 1920 MHz channel bandwidth for an OCB of 1.8675 GHz; (d) for a 3840 MHz channel bandwidth, mapping two 996-tone resource units (RU2*996) tone plan of a 160 MHz bandwidth according to IEEE 802.11ax or 802.11be to the 3840 MHz channel bandwidth for an OCB of 3.375 GHz; (e) for a 5760 MHz channel bandwidth, mapping three 996-tone resource units (RU3*996) tone plan of a 240 MHz bandwidth according to IEEE 802.11 be to the 5760 MHz channel bandwidth for an OCB of 5.6025 GHz; and (f) for a 7680 MHz channel bandwidth, mapping four 996-tone resource units (RU4*996) tone plan of a 320 MHz bandwidth according to IEEE 802.11 be to the 7680 MHz channel bandwidth for an OCB of 7.47 GHz.

In some implementations, under Option-2a and design 600, the specific numerology design may include at least the following: (a) for a 480 MHz channel bandwidth, selecting $\Delta F=1.875$ MHz, $T_{dft}=0.533$ μs, $T_{gi,\ short}=0.017$ μs, $T_{gi,\ normal}=0.033$ μs, $T_{gi,\ long}=0.067$ μs, $T_{sym}=T_{dft}+T_{gi}$, $F_s=480$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 960 MHz channel bandwidth, selecting $\Delta F=1.875$ MHz, $T_{dft}=0.533$ μs, $T_{gi,\ short}=0.017$ μs, $T_{gi,\ normal}=0.033$ μs, $T_{gi,\ long}=0.067$ μs, $T_{sym}=T_{dft}+T_{gi}$, $F_s=960$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 1920 MHz channel bandwidth, selecting $\Delta F=1.875$ MHz, $T_{dft}=0.533$ μs, $T_{gi,\ short}=0.017$ μs, $T_{gi,\ normal}=0.033$ μs, $T_{gi,\ long}=0.067$ μs, $T_{sym}=T_{dft}+T_{gi}$, $F_s=1920$ MHz, $N_{fft}=1024$, $N_{sd}=980$, $N_{sp}=16$, $N_{dc}=5$, $N_{st}=996$, $N_{guard}=(12, 11)$, and a tone plan for a 996-tone resource unit (RU996).

In some implementations, under Option-2b and design 700, the specific numerology design may include at least the following: (a) for a 480 MHz channel bandwidth, selecting $\Delta F=1.875$ MHz, $T_{dft}=0.533$ μs, $T_{gi,\ short}=0.017$ μs, $T_{gi,\ normal}=0.033$ μs, $T_{gi,\ long}=0.067$ μs, $T_{sym}=T_{dft}+T_{gi}$, $F_s=480$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 960 MHz channel bandwidth, selecting $\Delta F=1.875$ MHz, $T_{dft}=0.533$ μs, $T_{gi,\ short}=0.017$ μs, $T_{gi,\ normal}=0.033$ μs, $T_{gi,\ long}=0.067$ μs, $T_{sym}=T_{dft}+T_{gi}$, $F_s=960$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 1920 MHz channel bandwidth, selecting $\Delta F=3.75$ MHz, $T_{dft}=0.267$ μs, $T_{gi,\ short}=0.017$ μs, $T_{gi,\ normal}=0.033$ μs, $T_{gi,\ long}=0.067$ μs, $T_{sym}=T_{dft}+T_{gi}$, $F_s=1920$ MHz, $N_{fft}=512$, $N_{sd}=468$, $N_{sp}=16$, $N_{dc}=5$, $N_{st}=484$, $N_{guard}=(12, 11)$, and a tone plan for RU484.

In some implementations, under Option-3a, the specific numerology design may include the following: (a) for a 520 MHz channel bandwidth, mapping a single 242-tone resource unit (RU242) tone plan of a 20 MHz bandwidth according to IEEE 802.11 ax or 802.11 be to the 520 MHz channel bandwidth for an OCB of 0.492 GHz; (b) for a 1040 MHz channel bandwidth, mapping a single 484-tone resource unit (RU484) tone plan of a 40 MHz bandwidth according to IEEE 802.11ax or 802.11be to the 1040 MHz channel bandwidth for an OCB of 0.983 GHz; (c) for a 2080 MHz channel bandwidth, mapping a single 996-tone resource unit (RU996) tone plan of an 80 MHz bandwidth according to IEEE 802.11ax or 802.11be to the 2080 MHz channel bandwidth for an OCB of 2.023 GHz; (d) for a 4160 MHz channel bandwidth, mapping two 996-tone resource units (RU2*996) tone plan of a 160 MHz bandwidth according to IEEE 802.11ax or 802.11be to the 4160 MHz channel bandwidth for an OCB of 4.046 GHz; (e) for a 6240 MHz channel bandwidth, mapping three 996-tone resource units (RU3*996) tone plan of a 240 MHz bandwidth according to IEEE 802.11 be to the 6240 MHz channel bandwidth for an OCB of 6.070 GHz; and (f) for a 8320 MHz channel bandwidth, mapping four 996-tone resource units (RU4*996) tone plan of a 320 MHz bandwidth according to IEEE 802.11 be to the 8320 MHz channel bandwidth for an OCB of 8.093 GHz.

In some implementations, under Option-3a and design 800, the specific numerology design may include at least the following: (a) for a 520 MHz channel bandwidth, selecting $\Delta F=2.03125$ MHz, $T_{dft}=0.492$ μs, $T_{gi,\ short}=0.015$ μs, $T_{gi,\ normal}=0.031$ μs, $T_{gi,\ long}=0.062$ μs, $T_{sym}=T_{dft}+T_{gi}$, $F_s=520$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1040 MHz channel bandwidth, selecting $\Delta F=2.03125$ MHz, $T_{dft}=0.492$ μs, $T_{gi,\ short}=0.015$ μs, $T_{gi,\ normal}=0.031$ μs, $T_{gi,\ long}=0.062$ μs, $T_{sym}=T_{dft}+T_{gi}$, $F_s=1040$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2080 MHz channel bandwidth, selecting $\Delta F=2.03125$ MHz, $T_{dft}=0.492$ μs, $T_{gi,\ short}=0.015$ μs, $T_{gi,\ normal}=0.031$ μs, $T_{gi,\ long}=0.062$ μs, $T_{sym}=T_{dft}+T_{gi}$, $F_s=2080$ MHz, $N_{fft}=1024$, $N_{sd}=980$, $N_{sp}=16$, $N_{dc}=5$, $N_{st}=996$, $N_{guard}=(12, 11)$, and a tone plan for a 996-tone resource unit (RU996).

In some implementations, under Option-3b and design 900, the specific numerology design may include at least the following: (a) for a 520 MHz channel bandwidth, selecting $\Delta F=2.03125$ MHz, $T_{dft}=0.492$ μs, $T_{gi,\ short}=0.015$ μs, $T_{gi,\ normal}=0.031$ μs, $T_{gi,\ long}=0.062$ μs, $T_{sym}=T_{dft}+T_{gi}$, $F_s=520$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1040 MHz channel bandwidth, selecting $\Delta F=4.0625$ MHz, $T_{dft}=0.246$ μs, $T_{gi,\ short}=0.015$ μs, $T_{gi,\ normal}=0.031$ μs, $T_{gi,\ long}=0.062$ μs, $T_{sym}=T_{dft}+T_{gi}$, $F_s=1040$ MHz, $N_{fft}=256$, $N_{sd}=234$, $N_{sp}=8$, $N_{dc}=3$, $N_{st}=242$, $N_{guard}=(6, 5)$, and a tone plan for RU242; and (c) for a 2080 MHz channel bandwidth, selecting $\Delta F=4.0625$ MHz, $T_{dft}=0.246$ μs, $T_{gi,\ short}=0.015$ μs, $T_{gi,\ normal}=0.031$ μs, $T_{gi,\ long}=0.062$ μs, $T_{sym}=T_{dft}+T_{gi}$, $F_s=2080$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484).

In some implementations, under Option-4a, the specific numerology design may include the following: (a) for a 500 MHz channel bandwidth, mapping a single 242-tone resource unit (RU242) tone plan of a 20 MHz bandwidth according to IEEE 802.11 ax or 802.11 be to the 500 MHz channel bandwidth for an OCB of 0.473 GHz; (b) for a 1000 MHz channel bandwidth, mapping a single 484-tone resource unit (RU484) tone plan of a 40 MHz bandwidth according to IEEE 802.11ax or 802.11be to the 1000 MHz channel bandwidth for an OCB of 0.945 GHz; (c) for a 2000 MHz channel bandwidth, mapping a single 996-tone resource unit (RU996) tone plan of an 80 MHz bandwidth according to IEEE 802.11ax or 802.11be to the 2000 MHz channel bandwidth for an OCB of 1.945 GHz; (d) for a 4000 MHz channel bandwidth, mapping two 996-tone resource units (RU2*996) tone plan of a 160 MHz bandwidth according to IEEE 802.11ax or 802.11be to the 4000 MHz channel bandwidth for an OCB of 3.890 GHz; (e) for a 6000 MHz channel bandwidth, mapping three 996-tone resource units (RU3*996) tone plan of a 240 MHz bandwidth according to IEEE 802.11 be to the 6000 MHz channel bandwidth for an OCB of 5.836 GHz; and (f) for a 8000 MHz channel bandwidth, mapping four 996-tone resource units (RU4*996) tone plan of a 320 MHz bandwidth according to IEEE 802.11 be to the 8000 MHz channel bandwidth for an OCB of 7.781 GHz.

In some implementations, under Option-4a and design 1000, the specific numerology design may include at least the following: (a) for a 500 MHz channel bandwidth, selecting $\Delta F=1.953125$ MHz, $T_{dft}=0.512$ μs, $T_{gi,\ short}=0.016$ μs, $T_{gi,\ normal}=0.032$ μs, $T_{gi,\ long}=0.064$ μs, $T_{sym}=T_{dft}+T_{gi}$, $F_s=500$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1000 MHz channel bandwidth, selecting $\Delta F=1.953125$ MHz, $T_{dft}=0.512$ μs, $T_{gi,\ short}=0.016$ μs, $T_{gi,\ normal}=0.032$ μs, $T_{gi,\ long}=0.064$ μs, $T_{sym}=T_{dft}+T_{gi}$, $F_s=1000$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2000 MHz channel bandwidth, selecting $\Delta F=1.953125$ MHz, $T_{dft}=0.512$ μs, $T_{gi,\ short}=0.016$ μs, $T_{gi,\ normal}=0.032$ μs, $T_{gi,\ long}=0.064$ μs, $T_{sym}=T_{dft}+T_{gi}$, $F_s=2000$ MHz, $N_{fft}=1024$, $N_{sd}=980$, $N_{sp}=16$, $N_{dc}=5$, $N_{st}=996$, $N_{guard}=(12, 11)$, and a tone plan for a 996-tone resource unit (RU996).

In some implementations, under Option-4b and design 1100, the specific numerology design may include at least the following: (a) for a 500 MHz channel bandwidth, selecting $\Delta F=1.953125$ MHz, $T_{dft}=0.512$ μs, $T_{gi,\ short}=0.016$ μs, $T_{gi,\ normal}=0.032$ μs, $T_{gi,\ long}=0.064$ μs, $T_{sym}=T_{dft}+T_{gi}$, $F_s=500$ MHz, $N_{fft}=256$, $N_{sd}=234$, $N_{sp}=8$, $N_{dc}=3$, $N_{st}=242$, $N_{guard}=(6, 5)$, and a tone plan for a 242-tone resource unit (RU242); (b) for a 1000 MHz channel bandwidth, selecting $\Delta F=1.953125$ MHz, $T_{dft}=0.512$ μs, $T_{gi,\ short}=0.016$ μs, $T_{gi,\ normal}=0.032$ μs, $T_{gi,\ long}=0.064$ μs, $T_{sym}=T_{dft}+T_{gi}$, $F_s=1000$ MHz, $N_{fft}=512$, $N_{sd}=468$, $N_{sp}=16$, $N_{dc}=5$, $N_{st}=484$, $N_{guard}=(12, 11)$, and a tone plan for a 484-tone resource unit (RU484); and (c) for a 2000 MHz channel bandwidth, selecting $\Delta F=3.90625$ MHz, $T_{dft}=0.256$ μs, $T_{gi,\ short}=0.016$ μs, $T_{gi,\ normal}=0.032$ μs, $T_{gi,\ long}=0.064$ μs, $T_{sym}=T_{dft}+T_{gi}$, $F_s=2000$ MHz, $N_{fft}=512$, $N_{sd}=468$, $N_{sp}=16$, $N_{dc}=5$, $N_{st}=996$, $N_{guard}=(12, 11)$, and a tone plan for RU484.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a processor of a first apparatus, in a 60 GHz band wirelessly with a second apparatus by either or both:
transmitting first data or first information to the second apparatus; and
receiving second data or second information from the second apparatus,
wherein the communicating in the 60 GHz band wirelessly comprises communicating in the 60 GHz band wirelessly based on a specific numerology design with selection of a specific subcarrier frequency spacing and at least one of:
selection of a specific guard interval (GI) design; and
reuse of a preexisting channelization or tone plan,
wherein the selection of the specific subcarrier frequency spacing comprises selection of a subcarrier frequency spacing ($\Delta F$) which is a multiple of an Institute of Electrical and Electronics Engineers (IEEE) 802.11be subcarrier frequency spacing such that $\Delta F=\alpha*78.125$ kHz or a multiple of an IEEE 802.11ac subcarrier frequency spacing such that $\Delta F=\alpha*312.5$ kHz, with $\alpha$ being a positive integer and denoting a scalable factor.

2. The method of claim 1, wherein the selection of the specific GI design comprises selection of a GI from a plurality of options comprising:
a short GI with $T_{gi,\ short}=T_{dft}/32$;
a normal GI with $T_{gi,\ normal}=T_{dft}/16$; and
a long GI with $T_{gi,\ long}=T_{dft}/8$,
wherein $T_{gi}$ denotes a GI duration, and
wherein $T_{dft}$ denotes an orthogonal frequency-division multiplexing (OFDM) symbol duration.

3. The method of claim 1, wherein the reuse of the preexisting channelization or tone plan comprises reuse of an Institute of Electrical and Electronics Engineers (IEEE) 802.11ac, IEEE 802.11ax, IEEE 802.11ay or IEEE 802.11be channelization or tone plan.

4. The method of claim 1, wherein the specific numerology design comprises:
for a 540 MHz channel bandwidth, mapping a single 242-tone resource unit (RU242) tone plan of a 20 MHz bandwidth according to Institute of Electrical and Electronics Engineers (IEEE) 802.11be to the 540 MHz channel bandwidth for an occupied channel bandwidth (OCB) of 0.51 GHz;
for a 1080 MHz channel bandwidth, mapping a single 484-tone resource unit (RU484) tone plan of a 40 MHz bandwidth according to IEEE 802.11be to the 1080 MHz channel bandwidth for an OCB of 1.02 GHz;
for a 2160 MHz channel bandwidth, mapping a single 996-tone resource unit (RU996) tone plan of an 80 MHz bandwidth according to IEEE 802.11be to the 2160 MHz channel bandwidth for an OCB of 2.1 GHZ;
for a 4320 MHz channel bandwidth, mapping two 996-tone resource units (RU2*996) tone plan of a 160 MHz bandwidth according to IEEE 802.11be to the 4320 MHz channel bandwidth for an OCB of 4.2 GHz;
for a 6480 MHz channel bandwidth, mapping three 996-tone resource units (RU3*996) tone plan of a 240 MHz bandwidth according to IEEE 802.11be to the 6480 MHz channel bandwidth for an OCB of 6.3 GHZ; and
for a 8640 MHz channel bandwidth, mapping four 996-tone resource units (RU4*996) tone plan of a 320 MHz bandwidth according to IEEE 802.11be to the 8640 MHz channel bandwidth for an OCB of 8.4 GHz.

5. The method of claim 1, wherein the specific numerology design comprises:
for a 540 MHz channel bandwidth, selecting $\Delta F$ (a subcarrier frequency spacing)=2.109375 MHZ, $T_{dft}$ (an orthogonal frequency-division multiplexing (OFDM) symbol duration)=0.474 μs, $T_{gi,\ short}$ (a short guard interval (GI) duration)=0.015 μs, $T_{gi,\ normal}$ (a normal GI duration)=0.030 μs, $T_{gi,\ long}$ (a long GI duration)= 0.059 μs, $T_{sym}$ (a symbol duration)=$T_{dft}+T_{gi}$, $F_S$ (a sampling frequency)=540 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)= 242, $N_{guard}$ (a number of left and right guard tones)=(6, 5), and a tone plan for a 242-tone resource unit (RU242);

for a 1080 MHz channel bandwidth, selecting $\Delta F$=2.109375 MHZ, $T_{dft}$=0.474 µs, $T_{gi,\ short}$=0.015 µs, $T_{gi,\ normal}$=0.030 µs, $T_{gi,\ long}$=0.059 µs, $T_{sym}$=$T_{dft}$+$T_{gi}$, $F_S$=1080 MHZ, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and for a 2160 MHz channel bandwidth, selecting $\Delta F$=2.109375 MHZ, $T_{dft}$=0.474 µs, $T_{gi,\ short}$=0.015 µs, $T_{gi,\ normal}$=0.030 µs, $T_{gi,\ long}$=0.059 µs, $T_{sym}$=$T_{dft}$+$T_{gi}$, $F_S$=2160 MHZ, $N_{fft}$=1024, $N_{sd}$=980, $N_{sp}$=16, $N_{dc}$=5, $N_{st}$=996, $N_{guard}$=(12, 11), and a tone plan for a 996-tone resource unit (RU996).

6. The method of claim 1, wherein the specific numerology design comprises:

for a 540 MHz channel bandwidth, selecting $\Delta F$ (a subcarrier frequency spacing)=2.109375 MHZ, $T_{dft}$ (an orthogonal frequency-division multiplexing (OFDM) symbol duration)=0.474 µs, $T_{gi,\ short}$ (a short guard interval (GI) duration)=0.015 µs, $T_{gi,\ normal}$ (a normal GI duration)=0.030 µs, $T_{gi,\ long}$ (a long GI duration) =0.059 µs, $T_{sym}$ (a symbol duration)=$T_{dft}$+$T_{gi}$, $F_S$ (a sampling frequency)=540 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)= 242, $N_{guard}$ (a number of left and right guard tones)=(6, 5), and a tone plan for a 242-tone resource unit (RU242);

for a 1080 MHz channel bandwidth, selecting $\Delta F$=4.21875 MHZ, $T_{dft}$ 0.237 µs, $T_{gi,\ short}$=0.015 µs, $T_{gi,\ normal}$=0.030 µs, $T_{gi,\ long}$=0.059 µs, $T_{sym}$=$T_{dft}$+$T_{gi}$, $F_S$=1080 MHz, $N_{fft}$=256, $N_{sd}$=234, $N_{sp}$=8, $N_{dc}$=3, $N_{st}$=242, $N_{guard}$=(6, 5), and a tone plan for RU242; and for a 2160 MHz channel bandwidth, selecting $\Delta F$=4.21875 MHZ, $T_{dft}$=0.237 µs, $T_{gi,\ short}$=0.015 µs, $T_{gi,\ normal}$=0.030 µs, $T_{gi,\ long}$=0.059 µs, $T_{sym}$=$T_{dft}$+$T_{gi}$, $F_S$=2160 MHZ, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484).

7. The method of claim 1, wherein the specific numerology design comprises:

for a 480 MHz channel bandwidth, mapping a single 242-tone resource unit (RU242) tone plan of a 20 MHz bandwidth according to Institute of Electrical and Electronics Engineers (IEEE) 802.11ax or 802.11be to the 480 MHz channel bandwidth for an occupied channel bandwidth (OCB) of 0.45375 GHZ;

for a 960 MHz channel bandwidth, mapping a single 484-tone resource unit (RU484) tone plan of a 40 MHz bandwidth according to IEEE802.11ax or IEEE 802.11be to the 960 MHz channel bandwidth for an OCB of 0.9075 GHz;

for a 1920 MHz channel bandwidth, mapping a single 996-tone resource unit (RU996) tone plan of an 80 MHz bandwidth according to IEEE 802.11ax or IEEE 802.11be to the 1920 MHz channel bandwidth for an OCB of 1.8675 GHz;

for a 3840 MHz channel bandwidth, mapping two 996-tone resource units (RU2*996) tone plan of a 160 MHz bandwidth according to IEEE 802.11ax or IEEE 802.11be to the 3840 MHz channel bandwidth for an OCB of 3.375 GHz;

for a 5760 MHz channel bandwidth, mapping three 996-tone resource units (RU3*996) tone plan of a 240 MHz bandwidth according to IEEE 802.11be to the 5760 MHz channel bandwidth for an OCB of 5.6025 GHz; and for a 7680 MHz channel bandwidth, mapping four 996-tone resource units (RU4*996) tone plan of a 320 MHz bandwidth according to IEEE 802.11be to the 7680 MHz channel bandwidth for an OCB of 7.47 GHz.

8. The method of claim 1, wherein the specific numerology design comprises:

for a 480 MHz channel bandwidth, selecting $\Delta F$ (a subcarrier frequency spacing)=1.875 MHZ, $T_{dft}$ (an orthogonal frequency-division multiplexing (OFDM) symbol duration)=0.533 µs, $T_{gi,\ short}$ (a short guard interval (GI) duration)=0.017 µs, $T_{gi,\ normal}$ (a normal GI duration)=0.033 µs, $T_{gi,\ long}$ (a long GI duration)= 0.067 µs, $T_{sym}$ (a symbol duration)=$T_{dft}$+$T_{gi}$, $F_S$ (a sampling frequency)=480 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)= 242, $N_{guard}$ (a number of left and right guard tones)=(6, 5), and a tone plan for a 242-tone resource unit (RU242);

for a 960 MHz channel bandwidth, selecting $\Delta F$=1.875 MHZ, $T_{dft}$=0.533 µs, $T_{gi,\ short}$=0.017 µs, $T_{gi,\ normal}$= 0.033 µs, $T_{gi,\ long}$=0.067 µs, $T_{sym}$=$T_{dft}$+$T_{gi}$, $F_S$=960 MHZ, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and for a 1920 MHz channel bandwidth, selecting $\Delta F$=1.875 MHZ, $T_{dft}$=0.533 µs, $T_{gi,}$ short=0.017 µs, $T_{gi,\ normal}$= 0.033 µs, $T_{gi,\ long}$=0.067 µs, $T_{sym}$=$T_{dft}$+$T_{gi}$, $F_S$=1920 MHZ, $N_{fft}$=1024, $N_{sd}$=980, $N_{sp}$=16, $N_{dc}$=5, $N_{st}$=996, $N_{guard}$=(12, 11), and a tone plan for a 996-tone resource unit (RU996).

9. The method of claim 1, wherein the specific numerology design comprises:

for a 480 MHz channel bandwidth, selecting $\Delta F$ (a subcarrier frequency spacing)=1.875 MHZ, $T_{dft}$ (an orthogonal frequency-division multiplexing (OFDM) symbol duration)=0.533 µs, $T_{gi,\ short}$ (a short guard interval (GI) duration)=0.017 µs, $T_{gi,\ normal}$ (a normal GI duration)=0.033 µs, $T_{gi,\ long}$ (a long GI duration)= 0.067 µs, $T_{sym}$ (a symbol duration)=$T_{dft}$+$T_{gi}$, $F_S$ (a sampling frequency)=480 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)= 242, $N_{guard}$ (a number of left and right guard tones)=(6, 5), and a tone plan for a 242-tone resource unit (RU242);

for a 960 MHz channel bandwidth, selecting $\Delta F$=1.875 MHZ, $T_{dft}$=0.533 µs, $T_{gi,\ short}$=0.017 µs, $T_{gi,\ normal}$= 0.033 µs, $T_{gi,\ long}$=0.067 µs, $T_{sym}$=$T_{dft}$+$T_{gi}$, $F_S$=960 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and for a 1920 MHz channel bandwidth, selecting $\Delta F$=3.75 MHZ, $T_{dft}$=0.267 µs, $T_{gi,\ short}$=0.017 µs, $T_{gi,\ normal}$= 0.033 µs, $T_{gi,\ long}$=0.067 µs, $T_{sym}$=$T_{dft}$+$T_{gi}$, $F_S$=1920 MHZ, $N_{fft}$=512, $N_{sd}$=468, $N_{sp}$=16, $N_{dc}$=5, $N_{st}$=484, $N_{guard}$=(12, 11), and a tone plan for RU484.

10. The method of claim 1, wherein the specific numerology design comprises:

for a 520 MHz channel bandwidth, mapping a single 242-tone resource unit (RU242) tone plan of a 20 MHz bandwidth according to Institute of Electrical and Electronics Engineers (IEEE) 802.11ax or 802.11be to the 520 MHz channel bandwidth for an occupied channel bandwidth (OCB) of 0.492 GHZ;

for a 1040 MHz channel bandwidth, mapping a single 484-tone resource unit (RU484) tone plan of a 40 MHz bandwidth according to IEEE802.11ax or IEEE 802.11be to the 1040 MHz channel bandwidth for an OCB of 0.983 GHZ;

for a 2080 MHz channel bandwidth, mapping a single 996-tone resource unit (RU996) tone plan of an 80 MHz bandwidth according to IEEE 802.11ax or IEEE 802.11be to the 2080 MHz channel bandwidth for an OCB of 2.023 GHz;

for a 4160 MHz channel bandwidth, mapping two 996-tone resource units (RU2*996) tone plan of a 160 MHz bandwidth according to IEEE 802.11ax or IEEE 802.11be to the 4160 MHz channel bandwidth for an OCB of 4.046 GHz;

for a 6240 MHz channel bandwidth, mapping three 996-tone resource units (RU3*996) tone plan of a 240 MHz bandwidth according to IEEE 802.11be to the 6240 MHz channel bandwidth for an OCB of 6.070 GHz; and for a 8320 MHz channel bandwidth, mapping four 996-tone resource units (RU4*996) tone plan of a 320 MHz bandwidth according to IEEE 802.11be to the 8320 MHz channel bandwidth for an OCB of 8.093 GHZ.

11. The method of claim 1, wherein the specific numerology design comprises:

for a 520 MHz channel bandwidth, selecting $\Delta F$ (a subcarrier frequency spacing)=2.03125 MHZ, $T_{dft}$ (an orthogonal frequency-division multiplexing (OFDM) symbol duration)=0.492 µs, $T_{gi, short}$ (a short guard interval (GI) duration)=0.015 µs, $T_{gi, normal}$ (a normal GI duration)=0.031 µs, $T_{gi, long}$ (a long GI duration)=0.062 µs, $T_{sym}$ (a symbol duration)=$T_{dft}+T_{gi}$, $F_S$ (a sampling frequency)=520 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)=242, $N_{guard}$ (a number of left and right guard tones)=(6, 5), and a tone plan for a 242-tone resource unit (RU242);

for a 1040 MHz channel bandwidth, selecting $\Delta F$=2.03125 MHZ, $T_{dft}$=0.492 µs, $T_{gi, short}$=0.015 µs, $T_{gi, normal}$=0.031 µs, $T_{gi, long}$=0.062 µs, $T_{sym}$=$T_{dft}+T_{gi}$, $F_S$=1040 MHZ, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and for a 2080 MHz channel bandwidth, selecting $\Delta F$=2.03125 MHZ, $T_{dft}$=0.492 µs, $T_{gi, short}$=0.015 µs, $T_{gi, normal}$=0.031 µs, $T_{gi, long}$=0.062 µs, $T_{sym}$=$T_{dft}+T_{gi}$, $F_S$=2080 MHZ, $N_{fft}$=1024, $N_{sd}$=980, $N_{sp}$=16, $N_{dc}$=5, $N_{st}$=996, $N_{guard}$=(12, 11), and a tone plan for a 996-tone resource unit (RU996).

12. The method of claim 1, wherein the specific numerology design comprises:

for a 520 MHz channel bandwidth, selecting $\Delta F$ (a subcarrier frequency spacing)=2.03125 MHZ, $T_{dft}$ (an orthogonal frequency-division multiplexing (OFDM) symbol duration)=0.492 µs, $T_{gi, short}$ (a short guard interval (GI) duration)=0.015 µs, $T_{gi, normal}$ (a normal GI duration)=0.031 µs, $T_{gi, long}$ (a long GI duration)=0.062 µs, $T_{sym}$ (a symbol duration)=$T_{dft}+T_{gi}$, $F_S$ (a sampling frequency)=520 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)=242, $N_{guard}$ (a number of left and right guard tones)=(6, 5), and a tone plan for a 242-tone resource unit (RU242);

for a 1040 MHz channel bandwidth, selecting $\Delta F$=4.0625 MHZ, $T_{dft}$=0.246 µs, $T_{gi, short}$=0.015 µs, $T_{gi, normal}$=0.031 µs, $T_{gi, long}$=0.062 µs, $T_{sym}$=$T_{dft}+T_{gi}$, $F_S$=1040 MHZ, $N_{fft}$=256, $N_{sd}$=234, $N_{sp}$=8, $N_{dc}$=3, $N_{st}$=242, $N_{guard}$=(6, 5), and a tone plan for RU242; and for a 2080 MHz channel bandwidth, selecting $\Delta F$=4.0625 MHZ, $T_{dft}$=0.246 µs, $T_{gi, short}$=0.015 µs, $T_{gi, normal}$=0.031 µs, $T_{gi, long}$=0.062 µs, $T_{sym}$=$T_{dft}+T_{gi}$, $F_S$=2080 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484).

13. The method of claim 1, wherein the specific numerology design comprises:

for a 500 MHz channel bandwidth, mapping a single 242-tone resource unit (RU242) tone plan of a 20 MHz bandwidth according to Institute of Electrical and Electronics Engineers (IEEE) 802.11ax or 802.11be to the 500 MHz channel bandwidth for an occupied channel bandwidth (OCB) of 0.473 GHZ;

for a 1000 MHz channel bandwidth, mapping a single 484-tone resource unit (RU484) tone plan of a 40 MHz bandwidth according to IEEE 802.11ax or IEEE 802.11be to the 1000 MHz channel bandwidth for an OCB of 0.945 GHz;

for a 2000 MHz channel bandwidth, mapping a single 996-tone resource unit (RU996) tone plan of an 80 MHz bandwidth according to IEEE 802.11ax or IEEE 802.11be to the 2000 MHz channel bandwidth for an OCB of 1.945 GHz;

for a 4000 MHz channel bandwidth, mapping two 996-tone resource units (RU2*996) tone plan of a 160 MHz bandwidth according to IEEE 802.11ax or IEEE 802.11be to the 4000 MHz channel bandwidth for an OCB of 3.890 GHz;

for a 6000 MHz channel bandwidth, mapping three 996-tone resource units (RU3*996) tone plan of a 240 MHz bandwidth according to IEEE 802.11be to the 6000 MHz channel bandwidth for an OCB of 5.836 GHz; and for a 8000 MHz channel bandwidth, mapping four 996-tone resource units (RU4*996) tone plan of a 320 MHz bandwidth according to IEEE 802.11be to the 8000 MHz channel bandwidth for an OCB of 7.781 GHz.

14. The method of claim 1, wherein the specific numerology design comprises:

for a 500 MHz channel bandwidth, selecting $\Delta F$ (a subcarrier frequency spacing)=1.953125 MHZ, $T_{dft}$ (an orthogonal frequency-division multiplexing (OFDM) symbol duration)=0.512 µs, $T_{gi, short}$ (a short guard interval (GI) duration)=0.016 µs, $T_{gi, normal}$ (a normal GI duration)=0.032 µs, $T_{gi, long}$ (a long GI duration)=0.064 µs, $T_{sym}$ (a symbol duration)=$T_{dft}+T_{gi}$, $F_S$ (a sampling frequency)=500 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)=242, $N_{guard}$ (a number of left and right guard tones)=(6, 5), and a tone plan for a 242-tone resource unit (RU242);

for a 1000 MHz channel bandwidth, selecting $\Delta F$=1.953125 MHZ, $T_{dft}$=0.512 μs, $T_{gi,\ short}$=0.016 μs, $T_{gi,\ normal}$=0.032 μs, $T_{gi,\ long}$=0.064 μs, $T_{sym}$=$T_{dft}$+$T_{gi}$, $F_S$=1000 MHz, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and for a 2000 MHz channel bandwidth, selecting $\Delta F$=1.953125 MHZ, $T_{dft}$=0.512 μs, $T_{gi,\ short}$=0.016 μs, $T_{gi,\ normal}$=0.032 μs, $T_{gi,\ long}$=0.064 μs, $T_{sym}$=$T_{dft}$+$T_{gi}$, $F_S$=2000 MHz, $N_{fft}$=1024, $N_{sd}$=980, $N_{sp}$=16, Nc=5, $N_{st}$=996, $N_{guard}$=(12, 11), and a tone plan for a 996-tone resource unit (RU996).

15. The method of claim 1, wherein the specific numerology design comprises:

for a 500 MHz channel bandwidth, selecting $\Delta F$ (a subcarrier frequency spacing)=1.953125 MHZ, $T_{dft}$ (an orthogonal frequency-division multiplexing (OFDM) symbol duration)=0.512 μs, $T_{gi,\ short}$ (a short guard interval (GI) duration)=0.016 μs, $T_{gi,\ normal}$ (a normal GI duration)=0.032 μs, $T_{gi,\ long}$ (a long GI duration)=0.064 μs, $T_{sym}$ (a symbol duration)=$T_{dft}$+$T_{gi}$, $F_S$ (a sampling frequency)=500 MHZ, $N_{fft}$ (a number of fast Fourier transform (FFT) subcarriers)=256, $N_{sd}$ (a number of data-carrying subcarriers)=234, $N_{sp}$ (a number of pilot-tone subcarriers)=8, $N_{dc}$ (a number of direct-current tones)=3, $N_{st}$ (a total number of subcarriers)=242, $N_{guard}$ (a number of left and right guard tones)=(6, 5), and a tone plan for a 242-tone resource unit (RU242);

for a 1000 MHz channel bandwidth, selecting $\Delta F$=1.953125 MHZ, $T_{dft}$=0.512 μs, $T_{gi,\ short}$=0.016 μs, $T_{gi,\ normal}$=0.032 μs, $T_{gi,\ long}$=0.064 μs, $T_{sym}$=$T_{dft}$+$T_{gi}$, $F_S$=1000 MHZ, $N_{fft}$=512, $N_{sd}$=468, $N_{sp}$=16, $N_{dc}$=5, $N_{st}$=484, $N_{guard}$=(12, 11), and a tone plan for a 484-tone resource unit (RU484); and for a 2000 MHz channel bandwidth, selecting $\Delta F$=3.90625 MHZ, $T_{dft}$=0.256 μs, $T_{gi,\ short}$=0.016 μs, $T_{gi,\ normal}$=0.032 μs, $T_{gi,\ long}$=0.064 μs, $T_{sym}$=$T_{dft}$+$T_{gi}$, $F_S$=2000 MHZ, $N_{fft}$=512, $N_{sd}$=468, $N_{sp}$=16, $N_{dc}$=5, $N_{st}$=996, $N_{guard}$=(12, 11), and a tone plan for RU484.

16. An apparatus, comprising:
a transceiver configured to communicate wirelessly; and
a processor coupled to the transceiver and configured to perform operations comprising:
communicating, via the transceiver, in a 60 GHz band wirelessly with one other apparatus by either or both:
transmitting first data or first information to the other apparatus; and
receiving second data or second information from the other apparatus,
wherein, in communicating in the 60 GHz band wirelessly, the processor is configured to communicate in the 60 GHz band wirelessly based on a specific numerology design with selection of a specific guard interval (GI) design and at least one of:
selection of a specific subcarrier frequency spacing; and
reuse of a preexisting channelization or tone plan,
wherein the selection of the specific GI design comprises selection of a GI from a plurality of options comprising:
a short GI with $T_{gi,\ short}$=$T_{dft}$/32;
a normal GI with $T_{gi,\ normal}$=$T_{dft}$/16; and
a long GI with $T_{gi,\ long}$=$T_{dft}$/8,
wherein $T_{gi}$ denotes a GI duration, and
wherein $T_{dft}$ denotes an orthogonal frequency-division multiplexing (OFDM) symbol duration.

17. The apparatus of claim 16, wherein the selection of the specific subcarrier frequency spacing comprises selection of a subcarrier frequency spacing ($\Delta F$) which is a multiple of an Institute of Electrical and Electronics Engineers (IEEE) 802.11be subcarrier frequency spacing such that $\Delta F$=$\alpha$*78.125 kHz or a multiple of an IEEE 802.11ac subcarrier frequency spacing such that $\Delta F$=$\alpha$*312.5 kHz, with a being a positive integer and denoting a scalable factor.

18. The apparatus of claim 16, wherein the reuse of the preexisting channelization or tone plan comprises reuse of an Institute of Electrical and Electronics Engineers (IEEE) 802.11ac or IEEE 802.11ax, IEEE 802.11ay or IEEE 802.11be channelization or tone plan.

* * * * *